US012469356B2

United States Patent
Jain et al.

(10) Patent No.: US 12,469,356 B2
(45) Date of Patent: Nov. 11, 2025

(54) AUTOMATED PREPARATION AND DISPENSATION OF FOOD AND BEVERAGE PRODUCTS

(71) Applicant: 6D Bytes Inc., Sunnyvale, CA (US)

(72) Inventors: Vipin Jain, Saratoga, CA (US); Venkateswaran Ayalur, Cupertino, CA (US); Vijayasimha Doddabalapur, Foster City, CA (US)

(73) Assignee: 6D Bytes Inc., Sunnyvale, CA (US)

( * ) Notice: Subject to any disclaimer, the term of this patent is extended or adjusted under 35 U.S.C. 154(b) by 0 days.

(21) Appl. No.: 18/623,889

(22) Filed: Apr. 1, 2024

(65) Prior Publication Data

US 2024/0242559 A1     Jul. 18, 2024

Related U.S. Application Data

(63) Continuation of application No. 17/308,405, filed on May 5, 2021, now Pat. No. 11,961,354, which is a (Continued)

(51) Int. Cl.
*G07F 17/00* (2006.01)
*G07F 9/02* (2006.01)
(Continued)

(52) U.S. Cl.
CPC .......... *G07F 17/0064* (2013.01); *G07F 9/023* (2013.01); *G07F 11/165* (2013.01); *G07F 13/065* (2013.01); *G07F 17/0078* (2013.01)

(58) Field of Classification Search
CPC .... G07F 17/0064; G07F 9/023; G07F 13/065; G07F 17/0078; B25J 9/0087; B25J 9/0084; A47J 44/00; A47J 37/1228; A47J 36/321
See application file for complete search history.

(56) References Cited

U.S. PATENT DOCUMENTS

| 2,953,460 A | 9/1960 | Baker |
| 5,132,914 A | 7/1992 | Cahlander et al. |

(Continued)

FOREIGN PATENT DOCUMENTS

TW     132888     4/1990

OTHER PUBLICATIONS

C. H. Yun, et al., "Intelligent Management of Remote Facilities through a Ubiquitous Cloud Middleware," 2009 IEEE International Conference on Cloud Computing, 2009, 7 pages.

(Continued)

*Primary Examiner* — Timothy R Waggoner
(74) *Attorney, Agent, or Firm* — Fountainhead Law Group, PC

(57) ABSTRACT

In one embodiment, a system includes: a robotic arm assembly; a plurality of components arranged around the robotic arm assembly and positioned within reach of the robotic arm assembly; and a controller configured to control operation of the robotic arm assembly within the system. Each of the plurality of components is configured to either: store ingredients under predetermined environmental conditions; store food preparation tools; dispense ingredients; blend, cook, or assemble ingredients into a completed food item; provide cleaning functionality to the system and/or components thereof; provide user access to completed food items; or display information relevant to a food item or preparation thereof to users. Methods of using such systems to prepare and dispense food items are also disclosed, and generally include translating recipes into instructions executable by the robotic arm assembly and/or components of the system, communicating such instructions to the robotic arm assembly, and executing such instructions.

21 Claims, 13 Drawing Sheets

Related U.S. Application Data continuation of application No. 16/175,087, filed on Oct. 30, 2018, now Pat. No. 11,017,624, which is a continuation of application No. 15/422,260, filed on Feb. 1, 2017, now abandoned.

(60) Provisional application No. 62/290,355, filed on Feb. 2, 2016.

(51) Int. Cl.
*G07F 11/16* (2006.01)
*G07F 13/06* (2006.01)

(56) References Cited

U.S. PATENT DOCUMENTS

| | | | |
|---|---|---|---|
| 5,386,762 | A | 2/1995 | Gokey |
| 7,174,830 | B1 | 2/2007 | Dong |
| 7,762,181 | B2 | 7/2010 | Boland et al. |
| 8,276,505 | B2 | 10/2012 | Buehler |
| 8,560,334 | B2 | 10/2013 | Pertti |
| 8,909,800 | B1 | 12/2014 | Grebenschikov et al. |
| 8,948,912 | B2 | 2/2015 | Nakamoto et al. |
| 9,131,807 | B2 | 9/2015 | Roy et al. |
| 9,424,602 | B2 | 8/2016 | Taniguchi et al. |
| 9,563,372 | B2 | 2/2017 | Hwang et al. |
| 9,767,096 | B2 | 9/2017 | Goldberger et al. |
| 9,815,191 | B2 | 11/2017 | Oleynik |
| 10,518,409 | B2 | 12/2019 | Oleynik |
| 10,601,860 | B2 | 3/2020 | Mihan et al. |
| 10,686,620 | B2 | 6/2020 | Gould et al. |
| 11,286,101 | B2 * | 3/2022 | Jain .......................... B25J 9/161 |
| 11,657,669 | B2 * | 5/2023 | Jain .................... G07F 11/1657 |
| | | | 700/233 |
| 2004/0173103 | A1 | 9/2004 | Won |
| 2005/0193901 | A1 | 9/2005 | Buehler |
| 2007/0106422 | A1 | 5/2007 | Jennings et al. |
| 2013/0112529 | A1 | 5/2013 | W |
| 2014/0344420 | A1 | 11/2014 | Rjeili et al. |
| 2015/0058447 | A1 | 2/2015 | Albisu |
| 2015/0089497 | A1 | 3/2015 | Borzycki et al. |
| 2015/0188777 | A1 | 7/2015 | Frost |
| 2015/0290795 | A1 * | 10/2015 | Oleynik ................ B25J 9/0081 |
| | | | 700/257 |
| 2016/0052770 | A1 | 2/2016 | Ratti |
| 2016/0081515 | A1 | 3/2016 | Aboujassoum et al. |
| 2016/0179935 | A1 | 6/2016 | Bhattacharjya et al. |
| 2016/0338545 | A1 | 11/2016 | Shah et al. |
| 2017/0003046 | A1 | 1/2017 | Gould |
| 2017/0005817 | A1 | 1/2017 | Gould et al. |
| 2017/0011442 | A1 | 1/2017 | Hu et al. |
| 2017/0060629 | A1 | 3/2017 | Vora et al. |
| 2017/0063855 | A1 | 3/2017 | Vajravel |
| 2017/0064045 | A1 | 3/2017 | Pai et al. |
| 2017/0116661 | A1 | 4/2017 | Sundaram |
| 2017/0139902 | A1 | 5/2017 | Byron et al. |
| 2017/0221296 | A1 | 8/2017 | Jain et al. |
| 2017/0328997 | A1 | 11/2017 | Silverstein et al. |
| 2018/0183860 | A1 | 6/2018 | Majumdar |
| 2018/0206060 | A1 | 7/2018 | Yazdani et al. |
| 2018/0253459 | A1 | 9/2018 | Srinivasan Natesan et al. |
| 2018/0262388 | A1 | 9/2018 | Johnson et al. |
| 2020/0118400 | A1 | 4/2020 | Zalewski et al. |

OTHER PUBLICATIONS

C. Shih, et al., "Virtual Cloud Core: OpenCL Workload Sharing Framework for Connected Devices," 2013 IEEE Seventh International Symposium on Service-Oriented System Engineering, 2013, 8 pages.

D. Sulaiman, et al., "MAMoC: Multisite Adaptive Offloading Framework for Mobile Cloud Applications," 2017 IEEE International Conference on Cloud Computing Technology and Science (CloudCom), 2017, 8 pages.

Drucker et al., Faster Secure Cloud Computations with a Trusted Proxy, 2017, IEEE, p. 61-67 (Year: 2017).

Extended European Search Report dated Dec. 17, 2021 for EP Application # 19781332, 8 pages.

Hulea et al., WiPlatform, a sensing and event processing platform, 2015, IEEE, p. 214-317 (Year: 2015).

International Search Report and Written Opinion dated Jun. 14, 2019 for PCT/US2019/025421, 8 pages.

International Search Report and Written Opinion from PCT Application No. PCT/US2017/016298, dated Apr. 4, 2017; 8 pages.

Liu et al., Research and implementation of random test generator for VLIW DSPs, 2013, IEEE, p. 524-527 (Year:2013).

M. F. M. Fuzi, et al., "Virtual desktop environment on Cloud Computing Platform," 2014 IEEE 5th Control and System Graduate Research Colloquium, 2014, 5 pages.

Montgomery, J., "Is the Domino's Pizza Tracker Real?" The Huffington Post, retrieved from http://www.huffingtonpost.com/rev-joel-montgomery/dominos-pizza-tracker_b5947734.html, last updated Dec. 7, 2014, pp. 1-6.

Wang et al., Architecting a Distributed Bioinformatics Platform with iRODS and iPlant Agave API, 2016, IEEE, p. 420-423 (Year:2016).

\* cited by examiner

AUTOMATED PREPARATION AND DISPENSATION OF FOOD AND BEVERAGE PRODUCTS

CROSS REFERENCE TO RELATED APPLICATIONS

This application is a continuation application and, pursuant to 35 U.S.C. § 120, is entitled to and claims the benefit of earlier filed U.S. patent application Ser. No. 17/308,405, filed May 5, 2021, the content of which is incorporated herein by reference in its entirety for all purposes. Pursuant to 35 U.S.C. § 120, U.S. patent application Ser. No. 17/308,405 is entitled to and claims the benefit of the filing date of U.S. patent application Ser. No. 16/175,087 filed Oct. 30, 2018, the content of which is incorporated herein by reference in its entirety for all purposes. Pursuant to 35 U.S.C. § 120, U.S. patent application Ser. No. 16/175,087 is entitled to and claims the benefit of the filing date of U.S. patent application Ser. No. 15/422,260 filed Feb. 1, 2017, the content of which is incorporated herein by reference in its entirety for all purposes. Pursuant to 35 U.S.C. § 119(e), U.S. patent application Ser. No. 15/422,260 is entitled to and claims the benefit of the filing date of U.S. Provisional App. No. 62/290,355 filed Feb. 2, 2016, the content of which is incorporated herein by reference in its entirety for all purposes.

FIELD OF THE INVENTION

The present invention relates to preparation and dispensing of food and beverages, and more particularly, this invention relates to systems and techniques for automating the process of preparing and dispensing food in an efficient and customizable manner via a compact robotic infrastructure.

BACKGROUND

At present, preparation and dispensation of food and beverages is a predominantly human-mediated process. Preparing meals, snacks, beverages, etc. is a time-consuming process subject to imprecision due to variations introduced by the human preparer (e.g. measurement inaccuracy, imprecise heating, timing of operations such as heating, marinating, mixing, blending, etc.). Accordingly, it is both time consuming and difficult to precisely replicate the results obtained for a particular preparation activity over time.

In addition, human preparers may not follow appropriate sanitary procedures, and/or may prepare food and beverages using inappropriate techniques, ingredients, etc. For instance, humans may carry out cutting or slicing activities (e.g. with a knife) in a manner that risks harm to themselves or nearby individuals, may use an inappropriate tool for a particular task (e.g. serrated knife where straight edge is appropriate), etc. In another example, a human may prepare food or beverages using ingredients to which one or more consumers are allergic (e.g. peanuts, gluten, etc.), which are not acceptable to a particular consumer's dietary restrictions (e.g. diabetic, cultural or religious observances, vegetarian, etc.), and the human may do so without even being aware of the inappropriate nature of the ingredient(s). Accordingly, human-performed food preparation carries inherent risk of infection, harm, allergic reaction, and other undesirable outcomes due to human error.

Often users want to slightly alter the way their food was made or in some other cases they want to create a whole new recipe that involves different ingredients and preparation mechanisms. Presently there is no easy way to instruct or modify an existing recipe or author a new recipe that can be translated into a prepared meal using an automated system. This is very likely impeding the creation of recipes and new foods that are tailored to an individual's taste, diet or nutritional goals.

In certain approaches the end dish can be a combination of food items from different creators or chefs, for example a user could order a salad from one chef and soup from another and make a meal, the preparation and dispensing of such combinations is cumbersome today.

Some degree of automation or assistance with food and beverage preparation exists in limited capacities, e.g. coffee/espresso machines, vending machines, etc., but these conventional systems and methods of use thereof are at best characterized as semi-automated. A human operator must manually instruct the system to perform certain tasks (e.g. make espresso with volume X oz. at medium strength; dispense product in position "A2", etc.), and the range of tasks any given system is capable of performing are very limited, with machines typically being designed for a single task (e.g. dispense prepackaged food, heat food), or small number of highly similar tasks (e.g. grind beans to varying degrees of granularity, heat and add a volume of water in a predefined range, filter mixture, dispense liquid, discard solid). Thus, in order to semi-automate a narrow range of activities required in the preparation of food and beverages, a diverse array of many special purpose machines is necessary, which requires significant space and investment. Moreover, since a human operator is still involved in the preparation process, the aforementioned problems associated with human preparation of food and beverages are at best mitigated, but cannot be eliminated.

Accordingly, it would be of great advantage to provide systems and techniques for fully automating the food and beverage creation and preparation process, preferably in a manner so as to provide greater availability, precision and accuracy to the process, and avoid safety concerns, all the while conserving space and cost of a system capable of performing a wide variety of tasks useful in the context of food and beverage preparation and dispensation.

SUMMARY OF THE INVENTION

According to one embodiment, a self-contained, fully-automated food preparation and dispensing system includes: a robotic arm assembly; a plurality of components arranged around the robotic arm assembly and positioned within reach of the robotic arm assembly, wherein each of the plurality of components is configured to either: store ingredients under predetermined environmental conditions; store food preparation tools; dispense ingredients; blend, cook, or assemble ingredients into a completed food item; provide cleaning functionality to the system and/or components thereof; provide user access to completed food items; or display information relevant to a food item or preparation thereof to users. The system also includes a controller configured to control operation of the robotic arm assembly within the system.

According to another embodiment, a method of preparing and delivering a food item using a self-contained, fully-automated food preparation and dispensing system including a robotic arm assembly; a plurality of components arranged around the robotic arm assembly, each of the plurality of components being positioned within reach of the robotic arm assembly and capable of performing one or more processes; a recipe comprising instructions regarding: one or more ingredients to be included in the food item; a respective quantity of each of the ingredients; and one or more steps for combining and preparing the ingredients to form the food item. The system also includes a control system configured to manage the plurality of components. The method includes translating the instructions provided in the recipe into instructions executable by the robotic arm assembly and some or all of the plurality of components; communicating the instructions executable by the robotic arm assembly and some or all of the plurality of components to the robotic arm assembly; and executing the instructions executable by the robotic arm assembly and some or all of the plurality of components to form the food item.

Other aspects and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1A:
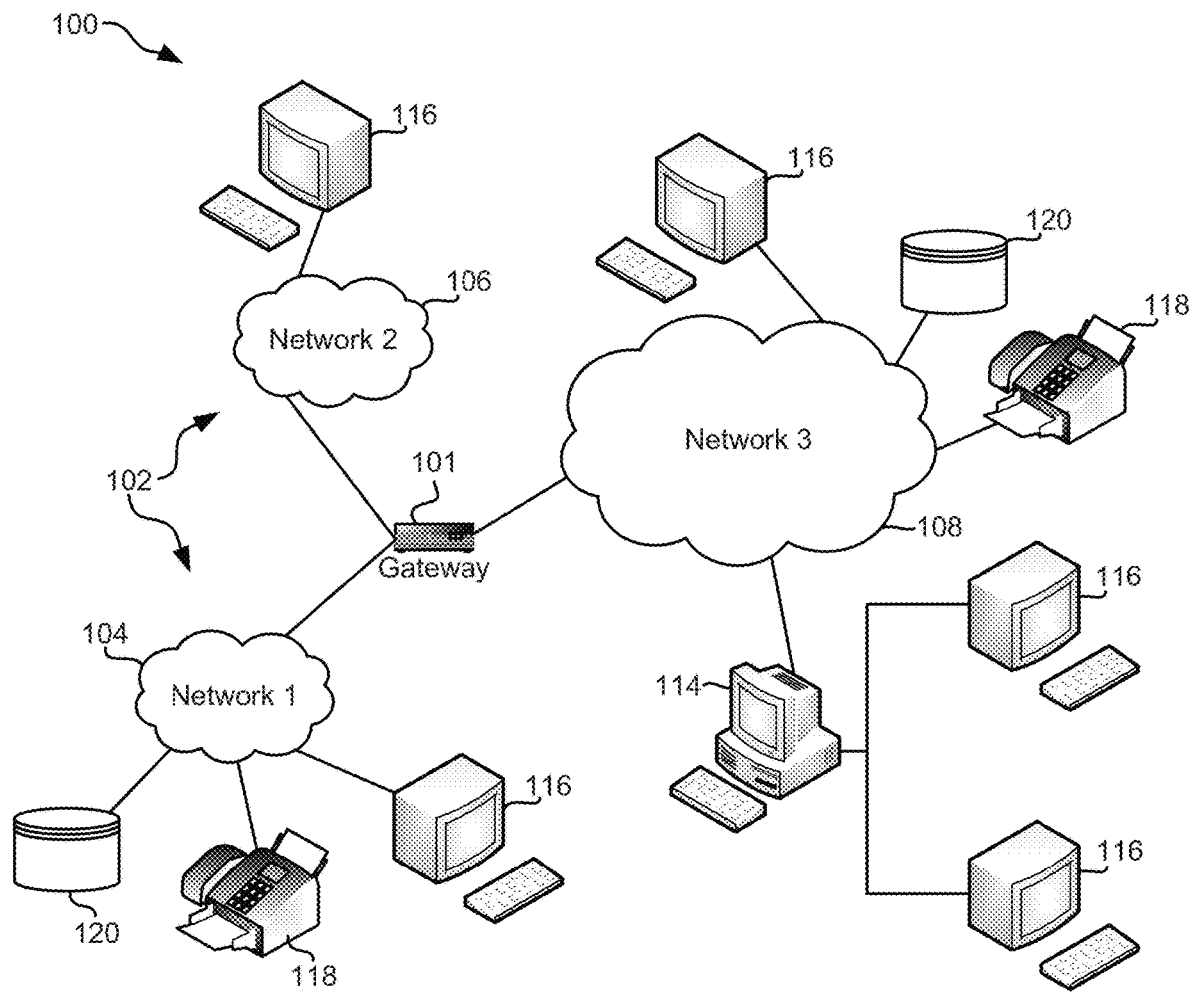
FIG. 1A is a drawing of a general network architecture, according to one embodiment of the presently disclosed inventive concepts.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of automated food and beverage creation, preparation and dispensation and/or related systems and methods. Particularly preferred embodiments are implemented via a kiosk including multiple different components configured to facilitate the retrieval, placement, combination, etc. of ingredients using appropriate culinary tools and a robotic arm with various custom interfaces designed to facilitate the arm engaging the culinary tools, ingredients, etc.

In one general embodiment, a self-contained, fully-automated food preparation and dispensing system includes: a robotic arm assembly; a plurality of components arranged around the robotic arm assembly and positioned within reach of the robotic arm assembly, wherein each of the plurality of components is configured to either: store ingredients under predetermined environmental conditions; store food preparation tools; dispense ingredients; blend, cook, or assemble ingredients into a completed food item; provide cleaning functionality to the system and/or components thereof; provide user access to completed food items; or display information relevant to a food item or preparation thereof to users. The system also includes a controller configured to control operation of the robotic arm assembly within the system.

According to another embodiment, a method of preparing and delivering a food item using a self-contained, fully-automated food preparation and dispensing system including a robotic arm assembly; a plurality of components arranged around the robotic arm assembly, each of the plurality of components being positioned within reach of the robotic arm assembly and capable of performing one or more processes; a recipe comprising instructions regarding: one or more ingredients to be included in the food item; a respective quantity of each of the ingredients; and one or more steps for combining and preparing the ingredients to form the food item. The system also includes a control system configured to manage the plurality of components. The method includes translating the instructions provided in the recipe into instructions executable by the robotic arm assembly and some or all of the plurality of components; communicating the instructions executable by the robotic arm assembly and some or all of the plurality of components to the robotic arm assembly; and executing the instructions executable by the robotic arm assembly and some or all of the plurality of components to form the food item.

As will be described in further detail below, the presently disclosed inventive concepts in accordance with various embodiments include and/or are configured to operate in conjunction with an online ordering system. The online ordering system may include many features, and generally is configured to receive information from remote customers (e.g. via a mobile application, kiosk application, web page, etc.) regarding food and beverage orders. For example, this information may include a selection of predefined product offerings, definition of a custom recipe to use in preparing food and/or beverages, a desired pickup time, desired pickup location, dietary restrictions and/or allergies of the customer(s), nutritional content of various recipes etc.

Preferably, pertinent information (e.g. custom recipes, order history, optimal and/or secondary pickup location(s), allergies, dietary restrictions, nutritional goals etc.) may be stored in a customer profile and utilized in subsequent order processing. For instance, predictive algorithms may be utilized to offer food and beverage products that are consistent with a user's dietary restrictions and allergies, nutritional goals, similar to items ordered by the customer historically, etc. Similarly, in the event of a failure in preparation or equipment, lack of availability of a particular product or ingredient, etc., a different (e.g. redundant) component of the system may be used, another aliquot or portion of ingredients may be obtained, and/or a user may be directed to a secondary pickup location to avoid service interruption, in various approaches.

Customers may also optionally store and/or publish custom recipes for review and/or selection by other customers, diversifying the type of food and/or beverage products available for consumption. In one approach, recipe creation may therefore be at least partially based on crowdsourcing to maximize the range of products that may be prepared in an automated manner.

In certain approaches, the recipe publication may be restricted, e.g. such that customers may view the list of ingredients but not the relative proportions and/or the preparation procedure, in order to provide a layer of protection for "secret" recipes which may be proprietary. In another embodiment the list of ingredients may also be restricted, and preferably in such approaches a customer may "validate" a custom recipe against dietary restrictions, allergies, nutritional goals etc. based on a transparent comparison between the ingredients included in the recipe and restrictions/allergies/nutritional goals defined in the user's profile.

In certain approaches, recipe publication may be monetized to encourage recipe creation by renowned chefs. In such an approach, some or all of the ingredients and/or the preparation steps may be concealed from the end users. This is similar to the "chef's secret sauce" today.

In order to maximize the availability and publicity of food and beverage products produced in an automated fashion as described herein, the foregoing ordering and publication features are preferably available over a network, e.g. the Internet, a dedicated network in a particular location or enterprise (e.g. airport, educational facility, cafeteria, restaurant, bar, coffee shop, etc.), or any other equivalent network architecture as would be understood by a person having ordinary skill in the art upon reading the present descriptions.

Accordingly, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Metro Area Network (MAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, sensors, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1A illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1A, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a MAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 116 may also be directly coupled to any of the networks, in one embodiment.

A peripheral 118 or series of peripherals 118, e.g. facsimile machines, printers, networked storage units, food preparation kiosks, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, a Raspberry Pi system running Rasbian, an Arduino system, an Android system or a Robot system or other proprietary systems, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 1B:
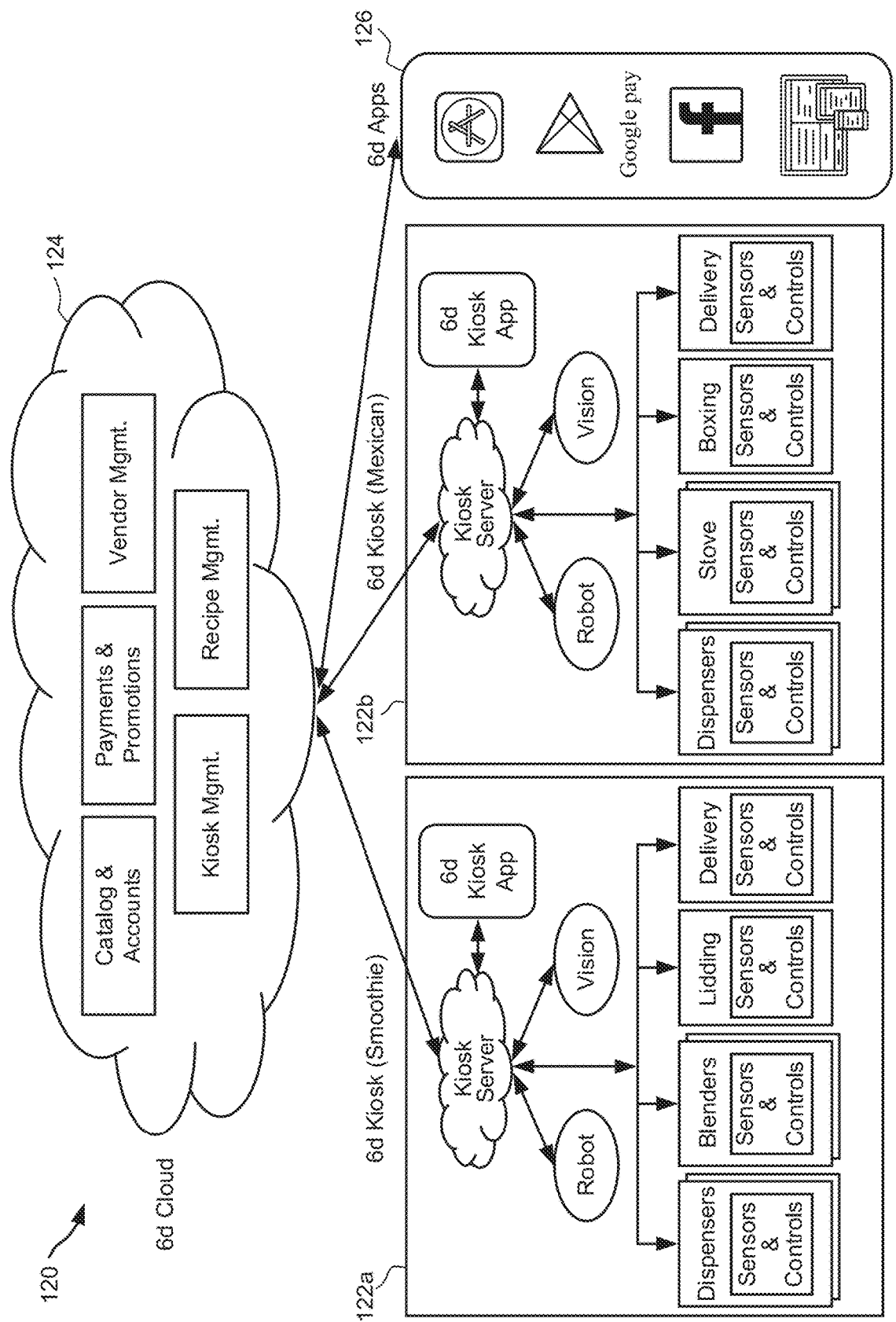
FIG. 1B is a simplified schematic of a network architecture configured for managing food preparation kiosks, associated recipes, vendors, and business transactions/information, according to one embodiment.
Figure 2:
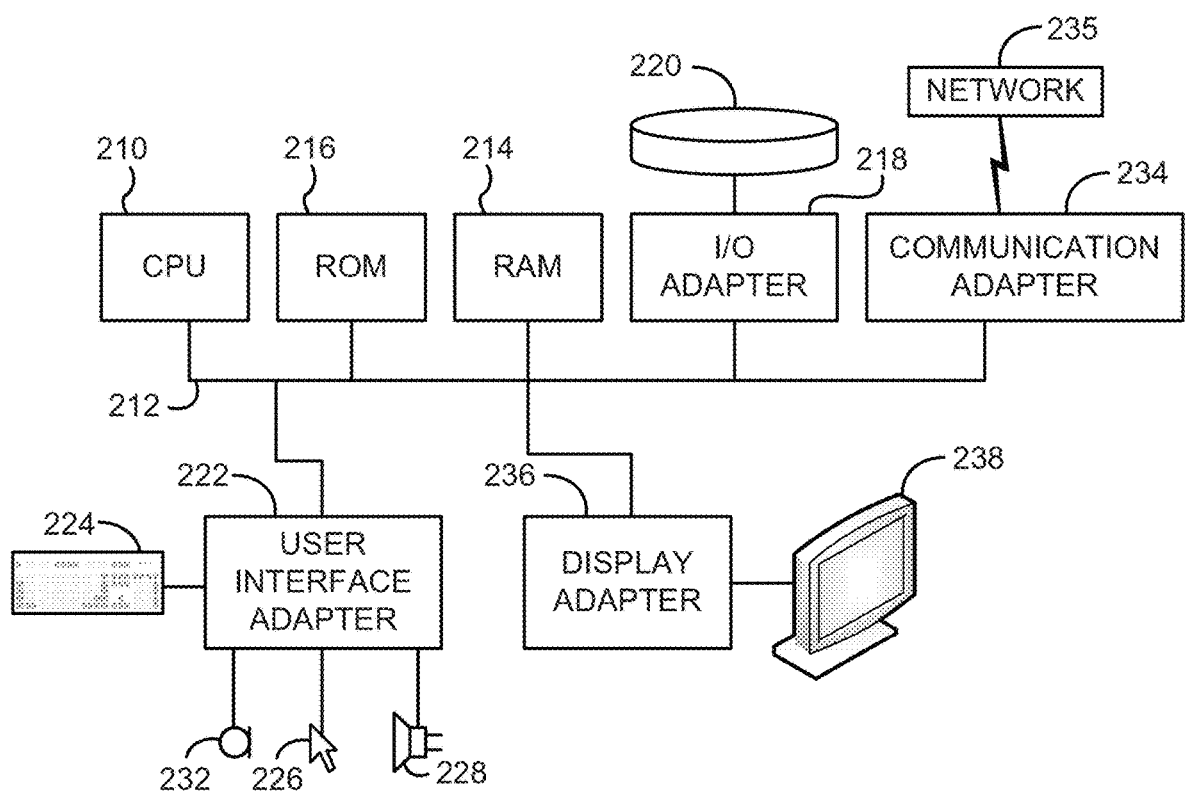
FIG. 2 is a simplified schematic of a workstation, according to one embodiment of the presently disclosed inventive concepts.

FIG. 2 shows a representative hardware environment associated with a user device 116 and/or server 114 of FIG. 1A, and/or a kiosk server as shown in FIG. 1B, in accordance with several embodiments. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units, Solid State Drive etc. 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, Android, IOS, Raspbian, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

As will be appreciated by persons having ordinary skill in the art upon reading the instant disclosures, in various embodiments it is advantageous to deploy a plurality of automated food and/or beverage preparation systems as disclosed herein, and further advantageous to connect some or all of the deployed systems to facilitate efficiency and handle failures across one or more systems. To this end, systems may be physically and/or communicatively coupled, e.g. via a central server or hosting system, to distribute workloads and/or provide failover capabilities to a network of automated food and/or beverage preparation systems, in preferred approaches.

For instance, in one approach primary and secondary automated beverage preparation systems may be physically connected, and employ common stations, ingredients, tools, etc. To reduce preparation time, e.g. to handle increased throughput during "peak" hours of operation, the primary system may manage the preparation, combination, etc. of ingredients into the beverage product(s), while the secondary system may manage the dispensation of beverage products into appropriate containers for consumption, and organization of finished food products within the system as a whole.

In more embodiments, a network architecture 120 suitable for use in conjunction with food preparation kiosks described herein is shown in FIG. 1B. The architecture 120 is configured to facilitate provision of food preparation services and associated functionalities such as recipe management and publication, mobile application integration, supply logistics, business transaction management, etc. as described in further detail below.

To facilitate such services and functionalities, the network architecture 120 includes one or more, preferably multiple, food preparation kiosks, a cloud-based management component, and mobile application software. As shown in FIG. 1B, the architecture 120 includes two kiosks 122a and 122b, a cloud-based management component 124, and mobile application software 126 available via an online marketplace (an "app store" or the like). The architecture 120 facilitates communication between the management component 124, the kiosks 122a and 122b and mobile application software via one or more network(s), e.g. as described generally above with reference to FIG. 1A.

In one embodiment, it is appropriate to view the kiosks 122a, 122b as being peripherals 118 in the context of architecture 100. The kiosks 122a and 122b may each include a server configured to run a kiosk application (e.g. a software program or environment configured to translate recipes into series of instructions interpretable by a robotic arm assembly to perform the requisite preparation tasks, and monitor such preparation e.g. using a vision system), a robotic arm assembly, a vision system, and a plurality of hardware components. The kiosk application, in various approaches, may take the form of a FoodOS™ as described elsewhere herein, and may include any features disclosed in connection therewith. The robotic arm and vision system will be described in further detail below.

In accordance with various embodiments, the hardware components may include dispenser modules, blending modules, cooking modules, lidding modules, boxing modules, cleaning modules, and/or storage modules, etc. as shown and described with reference to FIGS. 1B and 3-8 and equivalents thereof that would be appreciated by a person having ordinary skill in the art upon reviewing the present disclosures.

According to one embodiment, an architecture 120 specifically configured to facilitate food preparation services and associated functionality includes one or more kiosks each independently configured to provide food preparation services. Each kiosk may be configured to provide similar or different food types. For instance, in accordance with FIG. 1B kiosk 122a is configured to prepare liquid foods such as beverages (e.g. coffee, tea, smoothies, etc.), soups, custards, puddings, purées and the like. Kiosk 122b is configured to prepare solid foods, potentially of a particular variety or point of origin. Accordingly, each kiosk within the architecture 120 may be independently configured according to the type of foods to be provided, and associated preparation tasks. This configuration may take the form of including specific hardware components, placement of such hardware components, and/or preparation protocols to be used in the process of food preparation.

The preparation protocols are preferably determined based on recipes, as well as variations thereto which may be reflected in, and communicated to the kiosks by, modules of the cloud component 124. For instance, a kiosk management module may communicate with a recipe management module in response to receiving an order from a consumer, which may be submitted using a mobile application obtained from a proper source (e.g. mobile application software store 126). The kiosk management module may query the recipe management module to determine, for example, if the consumer has specified any dietary restrictions, flavor preferences, allergies, nutritional goals etc. and modify the recipe instructions accordingly. The kiosk management module may also be aware of other outstanding orders with partial or complete overlap with the instant order, and may instruct the preparation process to combine steps with similar ingredients, further modifying the preparation process and providing multiplex capabilities. In response to determining the user preferences, overlapping aspects of other outstanding orders, etc. the cloud component 124 may communicate instructions to an appropriate kiosk to initiate preparation of a particular food item in accordance with the recipe and any appropriate modifications thereto.

In addition, the cloud component 124 may include vendor management module(s) to control the supply of ingredients to various kiosks, and business modules such as a catalog and accounts module, and a payments and promotions module, each configured to provide back-end business transaction functionality to the architecture 120.

With continuing reference to FIG. 1B, and regarding the configuration of kiosks to prepare certain food types, "Mexican" food preparation kiosks may be configured to prepare burritos, tacos, bowls, tortas, flautas, etc., and certain associated ingredients, particularly those which require cooking or heating, such as rice, beans, meats, etc., as would be understood by a person having ordinary skill in the art upon reading the present descriptions. Meanwhile, "Delicatessen" food preparation kiosks may be configured to prepare foods generally available for purchase at a delicatessen store, such as fruit bowls, sandwiches of various varieties, pickles, salads such as pasta salad, potato salad, and conventional vegetable-based salads; or any other dish generally prepared at a delicatessen.

With continuing reference to FIG. 1B, in one embodiment kiosk 122a is configured to prepare smoothies, and kiosk 122b is configured to prepare "Mexican" food. Accordingly, each kiosk 122a, 122b includes different hardware and/or software components specifically configured to facilitate preparing the food(s) of the appropriate type. In the smoothie/"Mexican" example, kiosk 122a includes hardware inclusive of dispenser, blender, lidding, and delivery components. Each component includes or is communicatively coupled to one or more sensors and/or one or more controls (hardware and software) that provide the necessary sensory information and control logic/capabilities to carry out individual hardware tasks. Additionally each component provides information for successful operation, resilience and adaptive learning for a high availability operations.

For example, in accordance with one embodiment sensors which may be coupled to dispensers may include mass- or weight-measuring devices such as scales; volume-measuring devices such as flow meters, displacement monitors etc., other indicators such as level indicators, temperature sensors, odor indicators, humidity indicators, etc.; visual sensors such as cameras or other optical devices; etc. as would be understood by a person having ordinary skill in the art upon reading the present descriptions. Controls associated with dispensers may include pistons, vacuums and/or pumps, servos, stepper motors, agitators, etc. as would be understood by a person having ordinary skill in the art upon reading the present descriptions. In one embodiment, all of the foregoing sensors are utilized, with the possible exception of the odor indicator(s), which may be optionally included or excluded from the system.

For example, a dispensing component may receive instructions to dispense certain ingredients to a particular container, e.g. a blender component, in particular amounts. The amounts may be measured in units of mass (e.g. for frozen fruit, powders, grains or other solid ingredients) and/or volume (e.g. for juices and other liquid or semi-solid ingredients such as yogurt). Accordingly, the dispensing component may employ corresponding sensors to detect whether an amount of each ingredient dispensed to the particular container is within a predetermined threshold, e.g. ±10-20% of the expected volume or mass (depending on ingredient type) and thus ensure appropriate dispensation of each ingredient to the container. To ensure the proper ingredients are dispensed to the proper container, a vision system including cameras may observe the dispensation of the individual ingredients (e.g. determining whether a source location from which ingredients are obtained corresponds to a known location of the ingredient(s) needed to prepare a particular food item) to the particular container (similarly ensuring the ingredients are delivered to a destination location corresponding to a known location of the container to which the ingredients are needed). Preferred embodiments of an exemplary vision system will be described in further detail below.

In accordance with another embodiment, sensors coupled to blenders may include thermal sensors, torque sensors, time measuring devices, electrical sensors (e.g. for monitoring power consumption, current, voltage, etc.), etc. as would be understood by a person having ordinary skill in the art upon reading the present descriptions. Controls coupled to blender components may include power controls (e.g. an interlock device or equivalent "kill switch"), speed controls, timing controls, etc. as would be understood by a person having ordinary skill in the art upon reading the present descriptions. Controls coupled to blender components may also include agitators, such as an oscillating motor configured to stir ingredients.

For example, a blender component may be tasked with preparing a smoothie or soup, and may be monitored using various sensors to ensure proper preparation. The blender may detect, e.g., using a scale, that a certain amount of food has been delivered to the blender jar (for instance by comparing the measured amount to an expected amount to determine whether any "spillage" occurred during dispensation of ingredients, whether certain ingredients are missing or dispensed in an improper amount, etc. Spillage may be confirmed using visual sensors such as described in further detail below). Upon confirming the expected amount of ingredients are dispensed, the blender component may initiate a predetermined blending operation or program, and monitor the temperature of the food item during blending (e.g. to ensure soup reaches a minimum temperature such as 212 degrees Fahrenheit, or ensure a smoothie does not exceed a maximum temperature such as four degrees Fahrenheit). The speed and timing of various stages of the blending operation or program may be monitored using a timer and torque sensor to ensure the food item has the desired consistency, e.g. by detecting a blender failure or loss of torque, deviation from prescribed blend time, etc. as would be understood by a person having ordinary skill in the art upon reading the present descriptions.

In more embodiments, sensors coupled to lidding components may include pressure sensors, visual sensors, etc. and controls coupled to lidding components may include spatial manipulation devices such as the robotic arm included in the kiosk.

For instance, a lidding component may receive instructions to dispense and apply a lid to a blender, a cup or other container, etc. in the process of preparing a food item and/or preparing the food item for delivery to the consumer. A vision system such as mentioned above regarding dispensing components may similarly be employed to ensure the appropriate lid is delivered to the appropriate destination/device, and to ensure the lid is properly secured before proceeding with preparation/delivery. To further ensure the lids are properly secured, pressure sensors may measure pressure applied to a blender/cup during a lidding operation. Moreover, pressure sensors may be utilized to detect changes in pressure during food preparation, e.g. due to steam produced during preparation of a soup or hot beverage, and track progress of the preparation procedure and/or avoid unsafe conditions in the kiosk and/or corresponding components thereof. Additionally sensors such as vibration and pressure sensors can be used for predictive maintenance of components, systems and overall kiosk.

Controls in the form of the robotic arm, and optional components such as handles, etc. configured to facilitate the robotic arm's interaction with and/or manipulation of physical items within the kiosk may be utilized to accomplish the foregoing tasks. In one exemplary approach upon detecting an increase in internal blender temperature, the robotic arm may be moved so as to ensure the lid does not shift or become ajar during the blending operation.

Exemplary sensors coupled to a delivery component may include similar sensors as discussed above with reference to dispensers, e.g. including mass and/or volume-measuring sensors to ensure delivery of an appropriate amount of final food product to a container for delivery to the user (e.g. a cup or box), vision systems to ensure the proper food item is delivered to the proper container, as well as ensure the proper container is provided to/selected by the user upon completion of the preparation and any associated business transaction.

Now with reference to kiosk 122b, in an exemplary embodiment aligned with FIG. 1B the dispensing component and delivery components may have associated therewith similar sensors and controls as discussed above for the same components of kiosk 122a. Although kiosk 122b is configured to prepare solid food items, volume sensors may still be useful, e.g. for dispensing condiments onto sandwiches or sauces onto dishes.

Kiosk 122b includes a stove/oven component configured to perform selected cooking operations, e.g. to roast meats and/or vegetables, heat food items, etc. The stove/oven component may include a conventional gas or electric burner, and may be in the form of an oven-top stove, a conventional oven, a convection oven, an induction stove, a microwave oven, a fryer, a grill, a toaster oven, or any equivalent thereof that would be appreciated by a person having ordinary skill in the art upon reading the present descriptions.

Moreover, in various embodiments the stove/oven component may have coupled thereto one or more sensors configured to measure conditions within the cooking environment, such as temperature, humidity, odor etc. as well as sensors configured to measure cooking time. Visual sensors may provide awareness of food items present in the stove, e.g. to ensure proper cooking procedures are applied to each item and/or determine stove usage/capacity.

Accordingly, corresponding controls may be coupled to the stove component, including the robotic arm which is configured to place items on/in the stove/oven (e.g. in a particular location such as "large burner," "small burner," "middle rack," "top rack," etc.), temperature and/or humidity sensors affixed to the stove/oven and/or free-standing temperature sensors such as probes which may be inserted into food items during cooking, and timing sensors configured to measure an amount of time a particular food item has been exposed to particular cooking conditions. Controls may also include various electronic controls for managing the operation of the stove/oven, e.g. switching between conventional and convection cooking modes, use of particular elements or heat sources within the stove/oven, e.g. "bake" (bottom element) versus "broil" (top element) versus "toast" (both elements) settings, etc. as would be appreciated by a person having ordinary skill in the art upon reading the present descriptions.

Additionally controls may include the slew rate i.e. the rate at which the heat transfer occurs—for example it could be a low heat for 10 seconds, medium heat for 20 seconds and high heat for 10 seconds. These decisions are made on the basis of the ingredients and/or the "state" of the items to be cooked. The system is capable of learning based on "feature extraction" (the length and breadth of data collection exceeds human capabilities over time) and "regularization" based on factors such as user preferences, outside conditions (for example increase temperature by a few degrees when the outside temperature is cold or decrease when it is warm, the inherent heat content based on the ingredients for that specific soup.)

Boxing components such as included in kiosk 122b may, in accordance with various embodiments, include and/or be coupled to sensors configured to provide awareness with respect to the particular container and food item(s) being delivered thereto. In general terms, such sensors may include a vision system and mass/volume sensing devices such as described above with respect to dispensing components. Controls coupled to the boxing component may include the robotic arm, which is configured to place the various completed food item(s) in the appropriate container and/or within a particular location in a container (e.g. a sectioned container having different compartments for different portions of a dish).

In addition to the exemplary components discussed above, other components that may be included in kiosks but not shown in FIG. 1B may include storage components (which should be understood to be inclusive of all various types of storage, e.g. wet/dry ingredients, refrigerated, frozen, humidity controlled, etc. and may store containers, food items, utensils, preparation supplies, dispensers, etc.), cleaning components such as sinks, dishwashers, sterilizing chambers, etc.; display components configured to display pertinent information to consumers (e.g. the recipe by which the food item ordered by the consumer is being prepared, nutritional information, business transaction information, etc. as would be understood by a person having ordinary skill in the art upon reading the present descriptions); a plumbing component configured to provide drainage for various liquids used in preparing foods and/or cleaning equipment within the kiosk, generation of daily, monthly, etc. maintenance lists based on the operational feedback for that specific kiosk; special purpose machines such as espresso machines, toasters, waffle/crepe makers, steamers, instant pots, etc.; and utensils such as spoons, ladles, knives, slicers, peelers, etc. as would be understood by a person having ordinary skill in the art upon reading the present descriptions.

Components described above in accordance with various exemplary embodiments should be understood as illustrative, and not limiting on the scope of components which may be utilized in combination with various sensors and controls of kiosks as described herein. Rather, any component described above with reference to one sensor may be utilized in association with another sensor, in any combination or permutation. Generally, sensors may include pressure sensors; temperature sensors; humidity sensors; vibration sensors; torque sensors; optical sensors; light sensors; electrical sensors; time measuring devices; volume-measuring devices; and/or weight-measuring devices, in any combination and without limitation. Similarly, controls may generally include, without limitation, any combination of pistons; pumps; vacuums; servos; stepper motors; timing controls; power controls; agitators; interlocks; and/or slew rate controls, without departing from the scope of the present descriptions.

The kiosk is also designed to be customizable in terms of components such as lighting, sound, creating a customizable environment using robots. The kiosk thus lends itself to having a "character" that can attract customers.

In various instances, these additional components may be communicatively coupled to sensors and/or controls as described herein above, as well as other sensors and/or controls that would be appreciated by a skilled artisan reading these descriptions as being appropriate in the context of the respective component(s).

Sensors and controls described above in accordance with various exemplary embodiments should be understood as illustrative, and not limiting on the scope of sensors and/or controls which may be utilized in combination with various hardware components of kiosks as described herein. Rather, any sensor described above with reference to one component may be utilized in association with another component, in any combination or permutation.

Skilled artisans will appreciate that certain sensors are more appropriately coupled to certain hardware components, and in some cases certain sensor/control and hardware component combinations are critical to effective operation of the kiosk. For instance, mass and/or volume-measuring sensors are critical to certain dispensing operations, while time is critical to certain blending operations, pressure is critical to certain lidding operations, time and temperature are critical to cooking operations e.g. carried out by a stove component, and three-dimensional spatial awareness is critical to certain boxing operations.

Moreover, in some approaches some or all of the sensors and/or controls may be provided in the form of separate devices communicatively coupled to the various hardware components of the kiosks, or as devices/functions integrated with the hardware components (e.g. the power and speed controls of a blender may be provided with the blender as-is, and utilized without requiring separate controls be adapted to the blender unit).

The particular layout of various components of a kiosk such as kiosks 122a, 122b will be described in further detail below with reference to FIGS. 3-4B, in accordance with several exemplary embodiments.

Regardless of the particular type and/or arrangement of components within a given kiosk, each component is preferably communicatively coupled to a kiosk server configured to monitor and control operations within the kiosk. The server most preferably controls the operation of the robotic arm and vision system included with each kiosk, and coordinates such operation with the various hardware components in accordance with predetermined instructions, e.g. instructions determined based on a recipe, user preferences, availability of ingredients, etc. as would be understood by a person having ordinary skill in the art upon reading the present descriptions.

Notably, implementing the presently disclosed inventive concepts requires significant reliance on objective rules used to enable an automated system such as kiosks 122a, 122b, operating in an architecture 120 as shown in FIG. 1B to perform food preparation tasks conventionally carried out by human operators. Such rules must be determined experimentally, e.g. in order to ensure the resulting food product is in accordance with the consumer's expectation. Notably, such rules generally address challenges in enabling an automated, special purpose-machine such as a robotic arm and associated blending, dispensing, heating, boxing, lidding, delivery, etc. hardware components to perform tasks that humans perform using subjective criteria.

For example, assume a recipe calls for blending or mixing ingredients "until smooth." Typically a human would determine whether the blended/mixed ingredients are smooth based on subjective criteria (e.g. texture as determined based on tasting or handling a sample of the food item, or visual inspection). However, such subjective means of judgment are not available to an automated system, and as a result it must be determined experimentally how to blend ingredients until the desired consistency is achieved. Moreover, the particular parameters employed (e.g. blend time, speed, etc.) may vary depending on the nature of the ingredients (e.g. fresh versus frozen, dry versus liquid, etc.), adding further complexity to the preparation process.

Similarly, measurements provided in a typical recipe may not be appropriate for use in connection with an automated food preparation system such as disclosed herein. For example, many recipes express measurements in terms of volume, even when such volume is not necessarily representative of the actual amount of the ingredient. The most straightforward example is solid food/ingredients which may not fully occupy the volume of the container, and thus dispensing the same volume may result in different amounts of material. Worse still, since humans typically use subjective visual criteria to determine whether the measured amount of material is "correct" additional variations are introduced into the process of dispensing the appropriate amount of each ingredient using an automated system.

Accordingly, in order to "translate" the subjective process of preparing food as typically performed by a human, objective rules must be developed to ensure accurate and precise food preparation using an automated system in accordance with the inventive concepts described herein.

For example, and according to one embodiment of a process for preparing a smoothie, a recipe may call for the following ingredients and amounts: frozen cut mango—½ cup; frozen sliced strawberry—½ cup; frozen cut peach—1 cup; ice—1 cup; apple juice—¼ cup; strawberry juice—¼ cup; peach juice—½ cup. A typical human operator would measure these in a measuring cup and make the smoothie. Each of these measurements will vary a tiny bit contributing to a tiny to significant variation in smoothie flavor, consistency, amount, etc. each time a smoothie is being made by the human operator.

By contrast, in accordance with the presently disclosed inventive concepts as applied to this particular embodiment, the same measurements are translated into actual weights and volume as follows, with corresponding error tolerances: frozen cut mango—80 grams (tolerance+/−10 grams); frozen sliced strawberry—80 grams (tolerance+/−10 grams); ice—160 grams (tolerance+/−10 grams); frozen cut peach—160 grams (adjust to compensate for weight with a tolerance of +/−10 grams); strawberry juice—60 ml (tolerance+/−10 ml); apple juice—60 ml (tolerance+/−10 ml); peach juice—120 ml (adjust to compensate for density with a tolerance of +/−10 ml).

In general, translating traditional recipes into weights and/or volumes includes repeatedly measuring a specific ingredient according to volume, and determining an average amount (weight or volume) of the ingredient actually dispensed across the plurality of repeated measurements. Based on these data points, very precise amounts of material may be determined, providing the type of accuracy and scalability previously unattainable by humans using subjective criteria to measure ingredients.

For example, half a cup of frozen ingredients such as mango, strawberries, ice, etc. will vary in each measurement due to the air gaps between individual pieces of the ingredient. Using a number of samples the average value for a cup is computed as 80 grams for a half cup of the particular ingredient. This metric may then be employed as the base measurement metric for any recipe calling for the particular ingredient. The amount may be scaled so as to adjust for different volumes of the particular ingredient being called for in different recipes. Once the recipe is created, dish is made with the computed metric.

The recipe creator can adjust the values up/down to fine tune the taste to their perfection. Once recipe creator is satisfied, the recipe is baselined and stored for subsequent creation. A recipe creator can be the original recipe creator and subsequent consumer of the recipe. Each consumer is given similar knobs to adjust to their taste and perfection which becomes the signature for the recipe which can be published, as described in further detail elsewhere herein.

The inventive systems and preparation processes implemented thereby dynamically adjust for variations in dispensed ingredients to maintain consistency in the final product's taste, texture, and amount. For instance, continuing with the example described above, assume actual dispensing of the ingredients occurs in the order set forth above, and proceeds as follows. Frozen cut mango is dispensed in the amount of 75 grams; frozen sliced strawberry in the amount of 80 grams; and ice in the amount of 155 grams. This represents a deviation of 5 grams for the mango and the ice ingredients.

To adjust for the deviation, the system may adapt by adjusting the amount of the remaining frozen ingredient, but only within the stated tolerance (for frozen peach in this example, 10 grams). To determine the amount of the adjustment, the system computes the difference between the expected amount (80 grams mango, 80 grams strawberry, and 160 grams ice) and the actual dispensed amount (75 grams mango, 80 grams strawberry, 155 grams ice), and if the difference is within the error tolerance for the remaining ingredient(s), will adjust the amounts accordingly to maintain the proper total amount. In the present example, since the total deviation is 10 grams, and the remaining frozen ingredient (peach) has an error tolerance of 10 grams, 10 grams of additional peach (for a total of 170 grams) may be added to compensate for the deviations with respect to the mango and strawberry ingredients.

Similar adjustments may be made for liquids, based on volume. Adapting a recipe in this manner allows for dynamic adjustment maintaining both the taste and consistency of the resulting food product.

Returning now to the inventive food and beverage preparation concepts, in preferred approaches automation of food and beverage preparation and dispensation is implemented via a compact system, e.g. a kiosk, which includes a plurality of components configured to be engaged by a programmable robotic arm assembly, such as a six-dimensional robotic arm (three axes of linear movement and three axes of rotational movement).

Figure 4A:
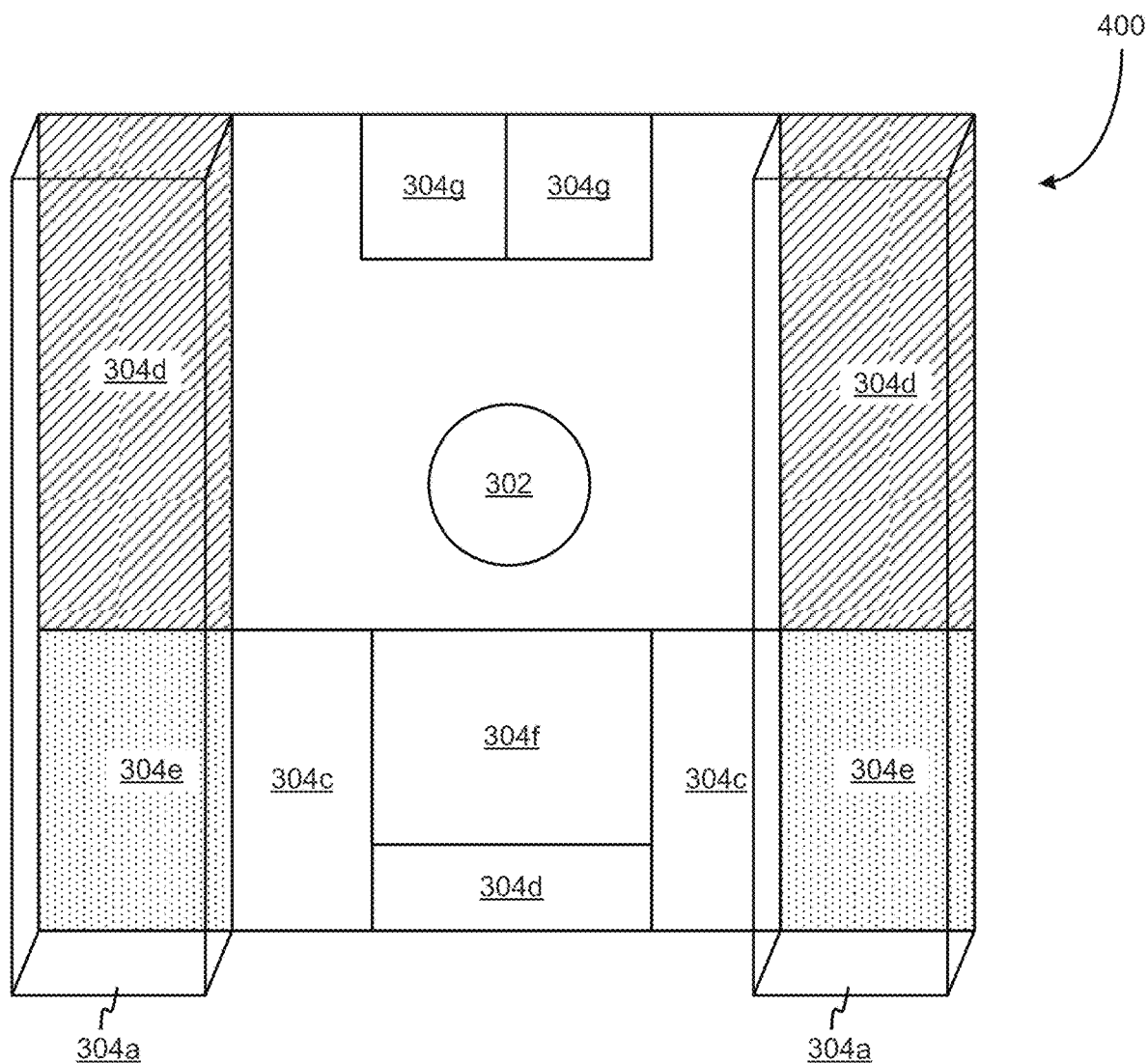
FIG. 4A is a simplified schematic of an upper portion of one particular implementation of a robotic kiosk configured to prepare and dispense food and beverage items in an automated fashion, according to one embodiment and shown from a top view.

The system, shown according to one exemplary embodiment in FIG. 4A, preferably includes the robotic arm(s) assembly in a central location (or approximately central location) to maximize the area within the system accessible to the robotic arm(s) assembly. Accordingly, arranged around the periphery of the system are a plurality of stations such as containers, shelving, etc. for housing different culinary tools, ingredients, etc. and within reach of the robotic arm assembly.

For instance, stations may include containers for wet or dry ingredients, crockery such as cups, lids, plates, bowls, cutlery, etc., measuring cups and/or spoons, scales, mixing and/or blending containers (such as blender jars, mixing bowls, etc.), blenders, heating components such as ovens, microwaves, heating lamps, etc., dispensers, and/or other culinary tools such as spatulas, beaters, etc. that are useful in the context of preparing food and/or beverages, as would be understood by a person having ordinary skill in the art upon reading the present descriptions.

The robotic arm assembly, e.g. via the controller as discussed below and shown in FIG. 4B, may be configured to retrieve the various tools, e.g. containers, utensils, etc. as set forth above, and move the retrieved material throughout the interior of the system, e.g. to various different stations according to a predetermined order based on the recipe being implemented to prepare a particular food or beverage product. Accordingly, in preferred approaches the location of various tools, ingredients, stations, etc. is predefined and provided to the robotic arm assembly to enable efficient and precise preparation of food and/or beverage products.

Additionally and/or alternatively, the robotic arm assembly may be configured to dynamically determine the location of various different tools, ingredients, etc. using one or more optical sensors (e.g. by detecting object shape, geometry, dimensions, and/or color, etc. using an image processing algorithm), using wireless communication techniques such as radio frequency identification (RFID), using a barcode reader, etc. as would be understood by a person having ordinary skill in the art upon reading the present descriptions. This dynamic identification capability advantageously allows the system to adjust for unexpected or improper placement of ingredients, tools, products, etc. throughout the interior and various stations of the system.

In still more approaches, the robotic arm assembly is configured to multiplex production of multiple potentially different food and/or beverage products. For instance, if plural pending orders rely on one or more common ingredients and/or processes (e.g. heating, cooling, mixing, etc.) the robotic arm assembly is configured to intelligently determine the overlapping aspects of the multiple pending orders and combine the production of each order with at least some overlap so as to reduce the overall preparation time. For example, if two orders rely on a common ingredient, and each ingredient is to be blended, according to each respective recipe, the robotic arm assembly may dynamically determine the optimum preparation procedure is to combine the amounts required by each respective recipe, prepare (blend) the ingredients as a batch, and dispense a corresponding amount of the common ingredient to two or more receptacles, e.g. cups, bowls, plates, mixing containers, etc.

To this end, and/or to provide increased throughput to the system as a whole, multiple robotic assemblies may be employed in various approaches, e.g. to divide labor across the system, avoid cross contamination, etc. as would be understood by a person having ordinary skill in the art upon reading the present disclosures. Additionally and/or alternatively, contamination of the robotic arm assembly may be prevented or avoided by surrounding the robotic arm assembly with a shroud such as a plastic film or sheet, in one embodiment.

In one embodiment, the robotic arm assembly may include and/or be coupled to a command and control system that acts as the hardware "brain" behind the system. The command and control system may issue commands to various sub-systems (e.g. dispensing, blending, mixing, lid/capping etc.), use sensors to monitor various parameters, detect anomalies and auto-correct some faults etc. As described above with reference to FIG. 1B, the command and control system may be embodied via the cloud component 124 and kiosk servers which cooperatively determine the appropriate instructions to provide to the robotic arm assembly, e.g. based on recipe characteristics, user preferences (allergies, preferences regarding particular ingredients, nutritional goals, etc.), ingredient availability, etc. as described herein.

In various embodiments, sensors may be configured to monitor one or more of temperature, heat content, moisture, weight, pressure, viscosity, particle size, particle uniformity, electrical properties (particularly for solutions, e.g. conductivity, capacitance, inductance, etc.), chemical properties (e.g. salinity, pH, etc.), resistance (e.g. pressure resistance for a resistive feedback or input component), capacitance (e.g. for capacitance-based input components), light, sound, static and kinetic forces etc. as would be understood by a person having ordinary skill in the art upon reading the present descriptions.

To facilitate sanitation and avoid cross-contamination, at least one station in the system is configured to facilitate cleansing of equipment and/or tools used in the preparation of food and beverage products. For instance, a rinsing station equipped with hot (e.g. 170° F. to facilitate sterilization and/or solubilization or carry-away of residue) and/or cold water lines and a sink or basin with a drain to carry away waste products may be employed as the cleansing station. As will be discussed in further detail with reference to FIG. 3-4B, cleansing may be performed in whole or in part using a rinsing station, and/or a dishwasher configured to further cleanse equipment using detergents, surfactants, etc. as would be understood by a person having ordinary skill in the art upon reading the present disclosures.

In at least one implementation, a rinsing station is employed to facilitate cleansing, but the rinsing station does not utilize any solvents, detergents, etc. to avoid damage to the robotic arm assembly.

Optionally, on a periodic basis the system may be further cleansed (and/or ingredients restocked, components replaced, etc.) with the assistance of a human operator. Importantly, the human operator is preferably not involved in the process of preparing and dispensing food and/or beverage items, but rather exclusively interacts with the system to restock, replace, or cleanse the system or components thereof. Ore preferably, the human operator may perform the additional maintenance, resupply, cleansing, etc. outside normal business hours so as to minimize service interruptions to consumers.

Advantageously, and particularly when used in combination with a restocking and/or auxiliary cleaning mechanism or service, the presently disclosed inventive concepts are characterized by providing superior availability of food and/or beverage products for consumption. In essence, since a robotic arm assembly's ability to prepare food and/or beverage products is limited only by access to sufficient resources and properly functioning equipment, automated food and/or beverage preparation and dispensation systems provide superior availability compared to conventional human-operated systems and techniques.

Availability may also convey the advantage that a particular system is capable of preparing a food and/or beverage product with very short notice (e.g. an airplane passenger may submit an order upon landing, and the desired product may be available for consumption upon entering the terminal) at all hours, without the need to staff the system, which may not be economically feasible or desirable for a human-operated system or technique, particularly during off-peak hours (e.g. 10 PM-6 AM).

The system may also include one or more dispensing stations, which are configured to dispense fresh and/or frozen solids, semi-solids, liquids, powders, and/or ice cubes, in preferred approaches. Dispensers may include containers coupled to an appropriate aperture (e.g. nozzle, moveable door, etc.) and dispensation may be assisted by gravity, or actively assisted using a piston, scoop, spoon, air pressure, etc. in various embodiments.

In the case of semi-solids, (e.g. frozen yogurt, gelatin, etc.), for both dispensing stations/components and/or storage it is advantageous to include an agitation mechanism (e.g. spatula, coil, corkscrew, etc.) to retard or prevent the semi-solid from being solidified (e.g. frozen, set, etc.). Similarly, in the case of solids or powders, it is advantageous to include an agitation mechanism such as a shaker to break up or dislodge agglomerates that may impede the dispensation process.

With continuing reference to dispensing ingredients, in various embodiments dispensation may be performed according to one or more of the following techniques.

In one approach, dispensing of ingredients may be performed by picking up pieces using a robotic gripper that is programmed to pick the required number of pieces for a given volume and/or weight of a given ingredient. Most useful for dispensing solids (fruits, vegetables and meats).

Dispensing of ingredients may be performed, in more approaches, using a programmable intelligent scooper that can scoop a given amount of a given ingredient in one or multiple scoops based on volume and/or weight of items along with robotic shaking to drop excess items. This approach is most useful for dispensing solids (e.g. ice, fruits, vegetables and meats) and powder.

Dispensing of ingredients may be performed, in still more approaches, using a spout in the front where the amount to be dispensed is controlled by programmatically controlling the pressure inside a dispenser for a given measure of a given ingredient. This approach is most useful for dispensing solids (e.g. ice, fruits, vegetables and meats), semi-solids and liquids with a spout in the front and a pressure mechanism on the back side.

Dispensing of ingredients may be performed using a spout in the front where the amount to be dispensed is controlled by programmatically controlling the angle of spout for a given measure of a given ingredient for a computed duration. This approach is most useful for dispensing semi-solids and liquids.

In still more approaches, dispensing of ingredients may be performed by picking up required number of servings of pre-measured ingredients, preferably organized in a cubby arrangement.

In still yet more embodiments, and particularly preferred when working with frozen solids, a vane system may be employed to facilitate dispensing of ingredients. Frozen foods are difficult to dispense in accurate quantities since they adhere together either by themselves or due to the ice that forms from the moisture content in atmospheric air. As a result, frozen food is typically dispensed to a coarse level of granularity in terms of weight or volume. Sometimes, they are catered in pre-measured sizes and dimensions to circumvent the problem. Pre-measured items are expensive and add wastage in terms of packaging materials. Accordingly, the presently disclosed inventive concepts provide a solution to dispensing frozen foods in precise quantities.

Through a combination of agitation (to prevent clunking) and vanes to support smaller quantity of dispensing, combined with feedback control from motors, a software driven application can utilize a robotic arm assembly to deliver accurate amounts of frozen food. Advantageously, the vanes are adaptable to the type of food by a combination of inner diameter, are length of the vanes and the depth of the vanes. For instance, fresh food, frozen food of various adhesive characteristics and sizes, and even powders of varying granularity may be accurately and precisely dispensed using a vane system as described herein.

Figure 8:
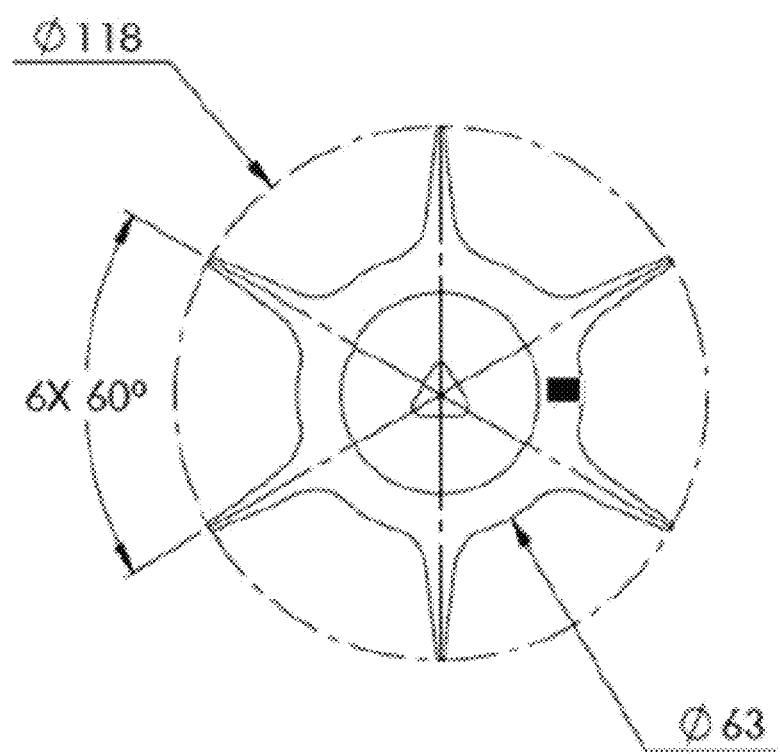
FIG. 8 is a simplified schematic of a dispensing system comprising a vane having a plurality of sections and configured to dispense ingredients of various types in precise amounts, according to one embodiment.

Generally, vanes are rotated using a motor by turning the paddles to drop food stored in the sectors into an appropriate container positioned below the sector. The vane, according to one embodiment, is shown in FIG. 8, and achieves control via configuring the vane spatially in terms of: inner diameter, outer diameter, number of vanes, depth, surface texture and rotation speed/direction.

For instance, the outer diameter of the vane may be fixed based on the dimensions of the chamber in which the vane operates. Inner diameter may be varied according the food characteristics (cut size, stickiness, behavior when exposed to air, etc.), dispense quantity and granularity required for the supported recipes. As shown in FIG. 8, the vane is characterized by an inner diameter of approximately 63 mm, while the vane has an outer diameter of approximately 118 mm. Each sector of the vane is characterized by an arc-width of 60 degrees, for a total of six vectors in the vane system of FIG. 8.

Of course, the number and arrangement of vanes may be controlled via employing a paddle designed to have varying number of sections, in order to control quantity and granularity of food dispensed.

Depth of the paddles (wheel with vanes) and number of paddles may be varied in order to control the volume of dispensed food. A solid cylinder with matching outer diameter of the vane may be used to limit the volume of each sector, in accordance with several embodiments.

Further still, the surface that comes in contact with the food may be smooth or textured, e.g. with bubbles, diamond patterns, or other texture, in order to reduce the stickiness of the food to the vanes. Creating a textured pattern creates an air pocket between the food and the surface and reduces the surface area of contact between the food and the vane. The design of the surface is based on the rules derived for that specific food using a combination of measurements—size, cut, stickiness factor, operating temperature range, speed of impelling, response to agitation, height of container, etc. as would be understood by a person having ordinary skill in the art upon reading the present descriptions.

Dispensing of food may be controlled via specialized rotation of the vane system. For example the motor may be used to rotate the vane clockwise and counter-clockwise with continuous feedback from the weight dispensed, simulating a "shaking" motion. The motor stops when the required quantity is dispensed. Moreover, the vane system may adapt the quantity of the next food item to be dispensed based on the current payload and the requirements of the recipe, e.g. to account for variations in dispensed ingredients as described elsewhere herein.

In addition, at least one station preferably is designated as a storage location for completed food and/or beverage products. The "finished products" station(s) are more preferably accessible by a customer, e.g. through a window or airlock configuration, and/or by the robotic arm assembly such that the robotic arm assembly may pass the finished product(s) through a window or airlock component and provide the finished products to a customer in proximity to the system.

In particularly preferred approaches, the finished products may be provided to the customer upon customer authentication, at which time the robotic arm assembly picks the food or beverage product associated with an order recently submitted by that customer, and dispenses that on a counter or in an opening in a vending machine. Authentication may be performed using a barcode, Credit Card, Apple Pay, NFC, BLE, WiFi based systems, etc. as would be understood by a person having ordinary skill in the art upon reading the present descriptions.

Figure 3:
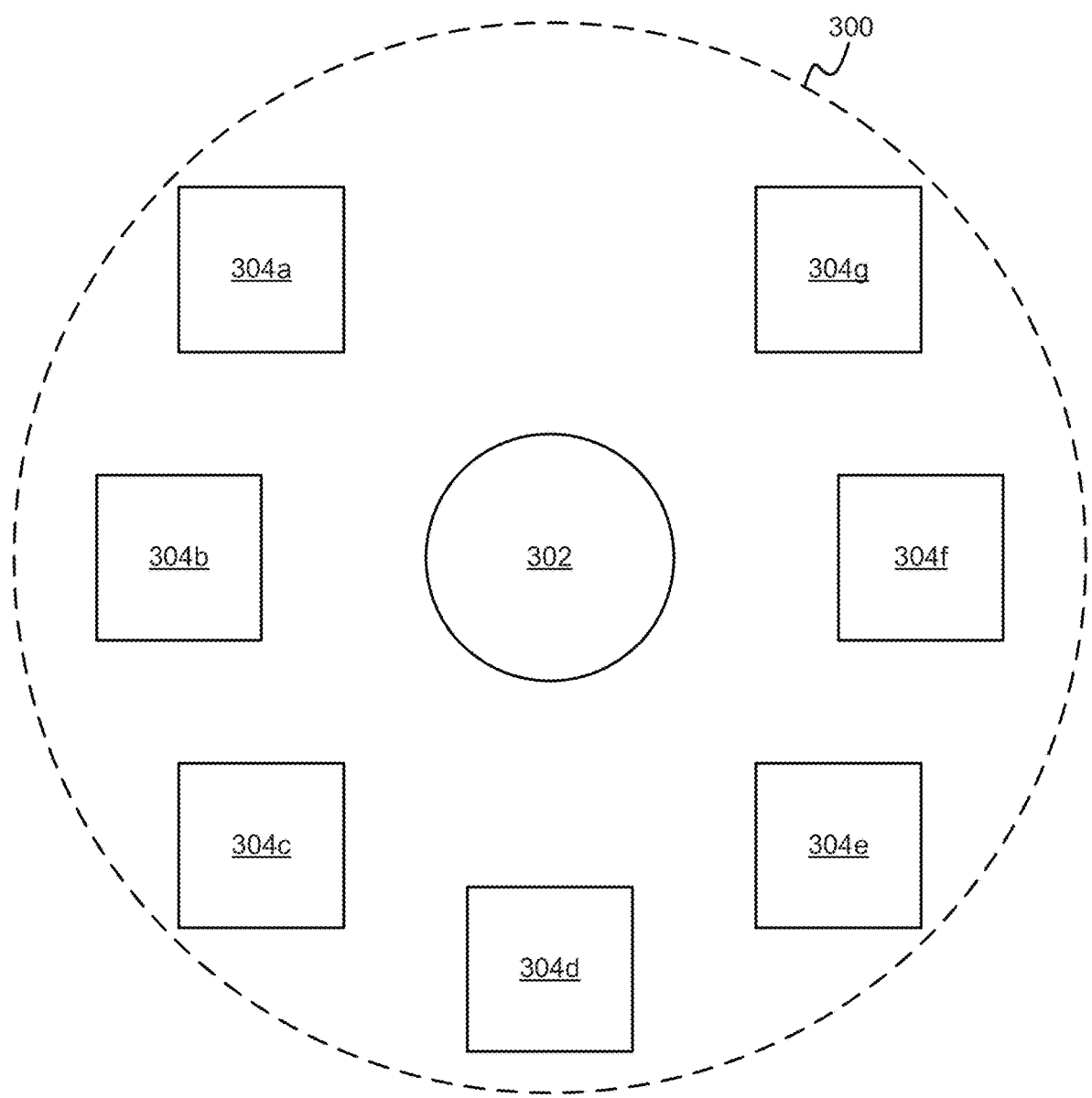
FIG. 3 illustrates a simplified schematic of a generic robotic kiosk arrangement configured to prepare and dispense food and beverage items in an automated fashion, according to various embodiments.
Figure 4B:
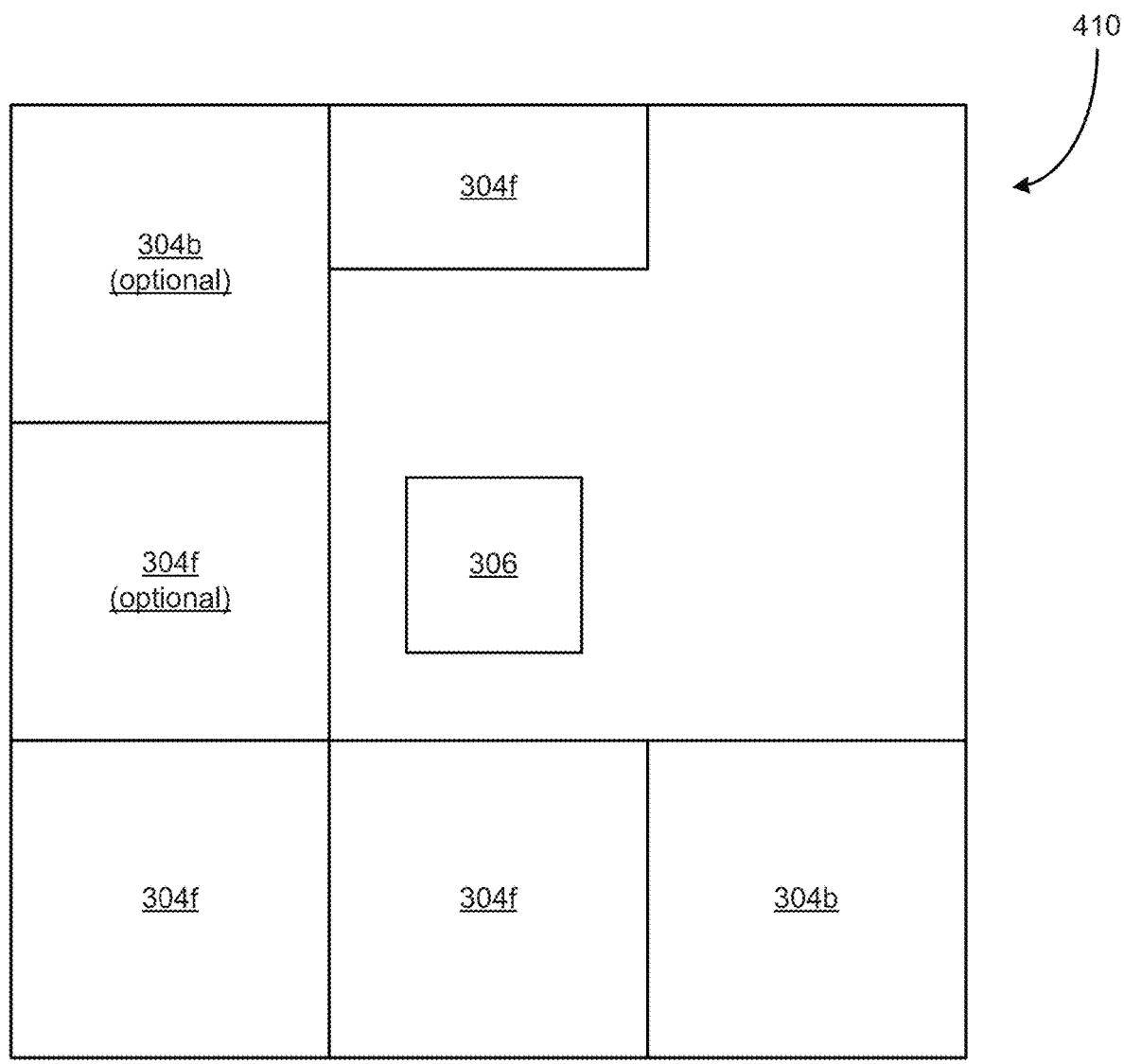
FIG. 4B is a simplified schematic of a lower portion of one particular implementation of a robotic kiosk configured to prepare and dispense food and beverage items in an automated fashion, according to one embodiment and shown from a top cross-sectional view.

Turning now to FIGS. 3-4B, exemplary embodiments of a generic kiosk arrangement (FIG. 3) and a specific implementation thereof (FIGS. 4A-4B) are shown. It will be appreciated that the generic arrangement shown in FIG. 3 generally sets forth the components included in preferred embodiments of the presently disclosed inventive kiosks, while FIGS. 4A-4B exhibit one arrangement of a compact, efficient kiosk in accordance with the generic arrangement shown in FIG. 3.

Now with reference to FIG. 3 in particular, a kiosk 300 includes a central robotic arm assembly 302, and a plurality of components 304a-304g arranged around the robotic arm assembly 302. Of course, in various approaches a kiosk may include more or less components than shown in FIG. 3. Moreover, the components may be arranged in any suitable configuration, such as a radial arrangement shown in FIG. 3, a substantially square arrangement as shown in FIGS. 4A-4B, or any other arrangement that would be understood as suitable by a skilled artisan upon reading the present disclosures. The primary limitation on the form of the arrangement of components within the kiosk is the range of the robotic arm assembly 302.

In preferred approaches, the robotic arm assembly may access and interact with each of the components in the kiosk. More preferably, the components are arranged in a manner so as to minimize the amount of motion (particularly back and forth motions where the path of the robotic arm assembly crosses a path taken in a previous operation) necessary in creating or preparing food items of the type offered by the particular kiosk. For instance, to the extent a similar or same order of operations (e.g. dispense solid items, followed by dispensing liquid ingredients, followed by lidding and blending, followed by dispensing blended components into a food container (e.g. cup) and lidding the food container) may be applied in preparing food items, the components may be arranged in an arc or sequence such that the arm may carry out all operations involving a first component, then move from the first component to a second, preferably adjacent, component and perform all operations involving the second component, etc. until the recipe is completed.

The components 304a-304g may include any combination of the exemplary component types discussed herein, in various embodiments and generally depending upon the nature of the food items to be created and prepared using the kiosk 300. For instance, if a kiosk is configured to prepare liquid food items such as cold beverages, then no oven or stove component may be necessary, but a freezer storage component may be necessary. Conversely, a kiosk configured to prepare hot sandwiches may not require a blender component, but may require an oven/stove component. Other examples of components required (or not) in connection with preparing various different types of food items will be appreciated by those having ordinary skill in the art upon reading the present descriptions, and may be employed without departing from the scope of the inventive concepts disclosed herein.

In accordance with one embodiment consistent with the generic arrangement of kiosk 300 as shown in FIG. 3, the components 304a-304g may include the following. In one approach, component 304a is a storage component storing a plurality of dispenser tools, e.g. cups, scoops, spoons, syringes, vanes, etc.

Component 304b is a storage component for storing food items, including solids and liquids, and having capability of storing food items at different environmental conditions, such as refrigeration (about 35 degrees Fahrenheit), freezing (about 0 degrees Fahrenheit), varying humidity levels (e.g. using dessicators, humidifiers, etc.), light conditions, etc. as would be understood by a person having ordinary skill in the art upon reading the present descriptions.

With continuing reference to FIG. 3, and component 304c may include or be a dispensing component configured to dispense prepared food containers, such as cups, bowls, wraps, boxes, take-out containers, etc. as would be understood by a person having ordinary skill in the art upon reading the present descriptions.

Now regarding component 304d, in preferred approaches this component may be a customer interaction and order pickup component. Accordingly, the component 304d preferably provides customers access to food items placed within a designated pickup area within or proximate to the component 304d. This access may be provided via a window, a curtain, a sliding door, etc. and preferably prevents contamination of the kiosk 300, e.g. via use of an airlock or other equivalent arrangement. The customer interaction and order pickup component 304d may also optionally include a display component (not shown) as described hereinabove, to display various information such as the recipe, stage of preparation, financial transaction information and/or interfaces, menu, recipe suggestions, dietary suggestions, etc. as would be appreciated by a person having ordinary skill in the art upon reading these descriptions.

With continuing reference to FIG. 3, component 304e may be yet another storage component, and in one embodiment may store preparation supplies, such as jars, bowls, mixing containers, etc. and/or utensils such as beaters, slicers, knives, whisks, spoons, blender blades and/or attachments, etc. as would be understood by a person having ordinary skill in the art upon reading the present descriptions.

Preferably, at least one component within the kiosk 300 includes or is a cleaning component 304f, and may include any constituent devices, etc. as described herein. For instance, the cleaning component may include a sink with access to temperature-controlled water supplies, and connected to an appropriate plumbing system. In more approaches cleaning component 304f may include sanitizing elements (e.g. sprayers, UV bulbs, thermal elements, etc.).

Still referring to kiosk 300 as shown in FIG. 3, preferably at least one preparation component 304g, which may include e.g. a blender component, a stove/oven component, etc. as would be appreciated by a person having ordinary skill in the art upon reading the present descriptions. The preparation component may generally include any component suitable for mixing, heating, blending, assembling, or otherwise manipulating ingredients to prepare a completed food item according to a recipe, in various approaches.

In particularly preferred embodiments, kiosks may include at least the components 304a-304g as shown in FIG. 3 and described hereinabove. However, it will be appreciated that the particular layout of the components within the kiosk 300 may be configured, e.g. by a user, to be in any suitable arrangement for the preparation of particular food types.

Turning now to FIGS. 4A-4B, an exemplary implementation of generic kiosk arrangement 300 such as shown in FIG. 3, is shown, according to simplified schematics.

With reference to FIG. 4A in particular, an upper level 400 of a kiosk is shown from a top-down view. The upper level includes a plurality of components 304a, 304c-304g arranged around a central robotic arm assembly 302. On opposite sides of the robotic arm assembly 302 are shelves positioned above the stations arranged on those sides of the upper level 400. As such, the upper level 400 may include multiple vertical levels or layers of space within which to arrange components 304a, 304c-304g.

In accordance with the particular arrangement of upper level 400 as shown in FIG. 4A, two preparation components 304g are arranged behind the robotic arm assembly, and may include blenders, ovens, stoves, etc. as described hereinabove. Arranged along a wall opposite the preparation components 304g are two storage components 304c. A first of the two storage components 304c may store containers for prepared food items, such as cups, bowls, wraps, boxes, etc., while the second of the storage components 304c may store lids. Arranged between the storage components 304c is a cleaning component 304f and a customer interaction and order pickup component 304d. As described below, the customer interaction and order pickup component 304d includes a designated pickup area, and a display (not shown). In the front corners of the upper level 400 are two storage components 304e, each storing supplies used in preparing food items, such as bowls, preparation jars, mixing tools, etc. Behind the storage components 304e and positioned in rear corners of the upper level 400 are storage components 304d configured to store completed orders, e.g. orders pending pickup, but for which the customer is not presently available to physically obtain the completed order. Positioned above the storage components 304d and 304e, and running along the side edges of the upper level 400 are storage components 304a storing dispensers for dispensing solid, liquid, pureed, etc. food items.

At the front of the system and optionally overlapping (vertically, e.g. via being suspended above) another station such as the rinsing station and/or optional dispensing station, the display may be included to provide visual indication to nearby customers, potential customers, etc. about the available menu, ingredients, ongoing preparation process, completed orders, orders in queue, videos demonstrating the preparation process, etc. as would be understood by a person having ordinary skill in the art upon reading the present descriptions.

Accordingly, either via the display (e.g. a touch-screen display) or other input device coupled thereto, the system is configured to receive user input, such as a selection of a product for purchase and preparation, to define a custom recipe, to tender payment, to view preparation processes, to access custom recipes published by others, etc.

Notably, although the exemplary system arrangement shown in FIGS. 4A-4B has a substantially square profile, in alternative approaches it may be advantageous to utilize a circular or hexagonal layout, which provides more complete access by the robotic arm assembly to the interior of the system, as square configurations may not allow the robotic arm assembly to access, e.g. corners of the system, depending on the range of the robotic arm assembly.

As an option, the system depicted in FIGS. 4A-4B may be implemented in conjunction with features from any other embodiment listed herein, such as those described with reference to the other FIGS. Of course, however, such system and others presented herein may be used in various applications and/or in permutations which may or may not be specifically described in the illustrative embodiments listed herein. Further, the systems presented herein may be used in any desired environment.

Turning now to FIG. 4B, a top-down cross sectional view of a lower level 410 the kiosk is shown, according to one embodiment. As will be appreciated by skilled artisans viewing the figures and reading the instant descriptions, the upper level 400 shown in FIG. 4A may be positioned on or above some or all of the components depicted schematically in lower level 410 of FIG. 4B.

As shown in FIG. 4B, lower level 410 includes a controller 306 positioned below and communicatively coupled to the robotic arm assembly 302. The controller 306 controls the operation and movement of the robotic arm assembly 302 in conjunction with the software described herein, particularly foodOS™ to translate recipe instructions into instructions capable of being performed by the robotic arm. For example, the controller receives the translated instructions from the FoodOs™ or other connected software, and executes the instructions to realize creation of the food item specified in the recipe. Actual translation of the instructions in the recipe into instructions interpretable by the robot may occur within the foodOS™ environment.

In addition to controller 306, arranged along a front edge of the kiosk lower level 410 are two cleaning components 304f, which may include a first cleaning component 304f including a dishwasher, and a second cleaning component 304f including a drainage tank and plumbing, e.g. to service the sink of cleaning component 304f of the upper level 400. Also arranged along the front edge, and in a front right corner of the lower level 410 is a storage component 304b configured to store food items of various types, e.g. solids and liquids, and under various conditions, e.g. frozen, refrigerated, room temperature, dry, humidified, etc. Optionally, the lower level 410 may include additional storage component(s) 304b, e.g. in a rear-left corner of the lower level 410; and/or optional additional cleaning component 304f positioned along a left side of the lower level 410. The optional cleaning component 304f may include an additional dishwasher, and/or clean water tank, in some approaches. At the rear of lower level 410 is a cleaning component 304f preferably including connections to plumbing facilities of the environment in which the kiosk is located, e.g. a mall, airport, or standalone establishment.

Preferably, all components, stations, etc. shown in FIGS. 4A-4B are physically accessible by the robotic arm assembly. However, in some approaches the robotic arm assembly need not access the controller, plumbing/drainage tank, and/or building plumbing as shown in FIG. 4B, but may access only the freezer and storage, dishwasher(s) and/or clean water tank(s).

Regardless of robotic access, and as shown in FIG. 4B, the system also preferably includes at least one freezer and storage station, which may include a refrigerator, freezer and/or corresponding systems (e.g. cooling system, fan, housing, etc.) understood to be equivalent thereto by skilled artisans at the time of the present invention and upon reading the instant descriptions. Similarly, the system may include one or more dishwasher(s) and/or clean water tanks to facilitate cleansing of equipment, and/or provide water for preparation of food and/or beverage products.

Referring still to FIG. 4B, the robotic arm assembly shown in FIG. 4A is coupled to, and may optionally be placed on top of, a controller configured to control movement of the various components of the robotic arm assembly. The controller and robotic arm assembly, in some approaches, may include any known robotic arm assembly (e.g. arm) and corresponding control software and/or hardware suitable for enabling the robotic arm assembly to access various components, ingredients, tools, stations, etc. of the system. For instance, in one embodiment Raspberry Pi, ARDUINO® and/or UDOO® components, interfaces, and/or software may be employed for controlling the robotic arm assembly.

The software utilized by the controller preferably, allows the integration of a variety of I/O components into the system, e.g. via a processor of the controller. In this manner, it is advantageously possible to provide a "plug and play" functionality with respect to various tools, components, etc. that might be useful to a particular system.

Suitable software for use in conjunction with the presently disclosed systems will be described in further detail below, according to exemplary embodiments.

As will be appreciated by skilled artisans reading the present disclosure, commercial parts/equipment that are easily available to consumers and commercial kitchen operators are generally not designed to be compatible with robotic assemblies as disclosed herein. Accordingly, it is advantageous to make tools standard in the culinary industry compatible with the robotic arm assembly and corresponding software by attaching mechanical and electrical interfaces. This facilitates building a flexible kitchen that can be reconfigured to make and dispense different recipes and types of food (with software control). Useful operations that may be performed on these commercial parts/equipment include, in one embodiment, (1) opening/closing of a jar/bin/storage unit/any kind of enclosure; and (2) picking, holding, moving, dispensing out of these parts/equipment.

Figure 5:
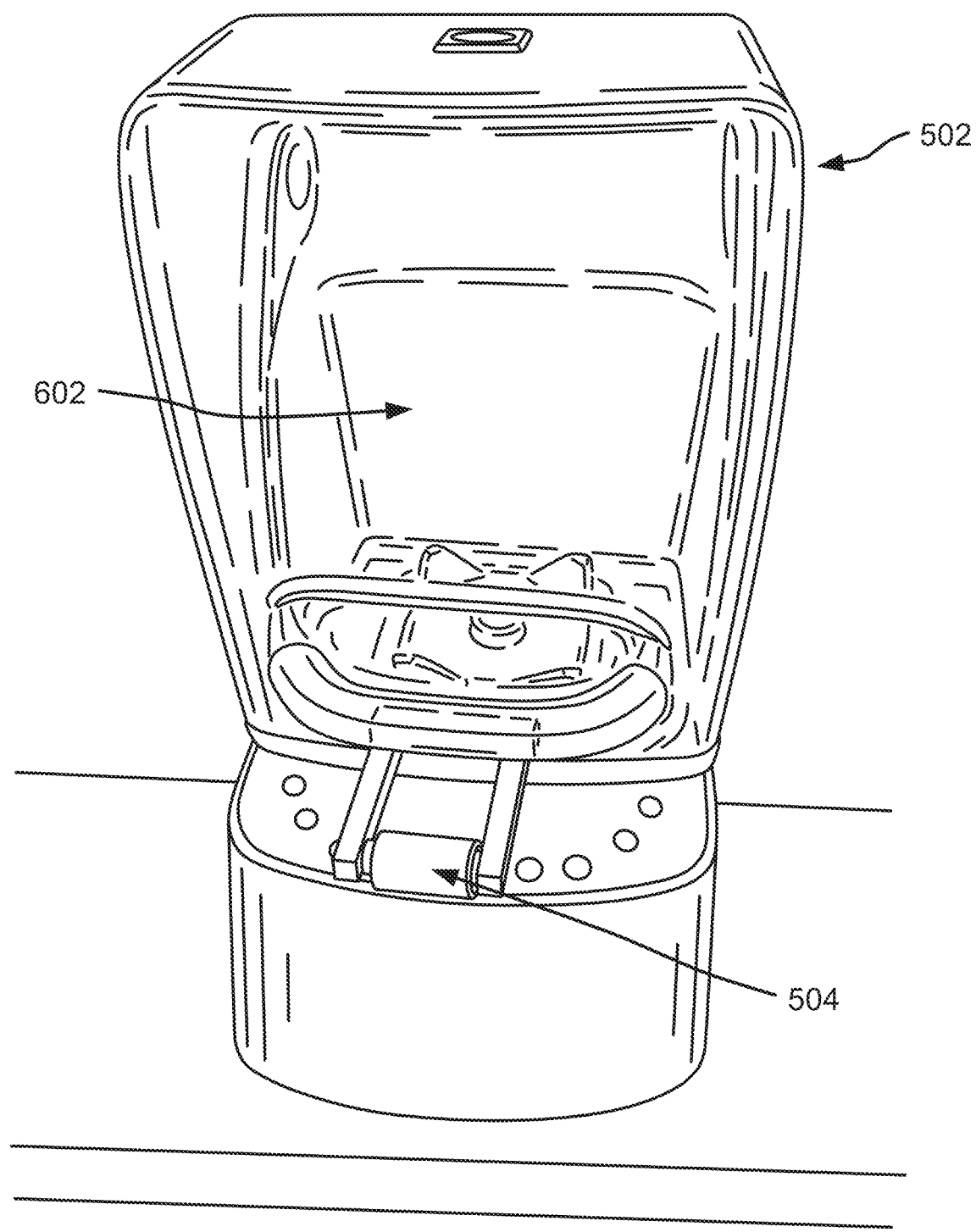
FIG. 5 is a photographic image depicting a blender assembly with a splash guard having a customized interface configured to engage a robotic arm and facilitate automation of food and beverage preparation, according to one embodiment
Figure 6:
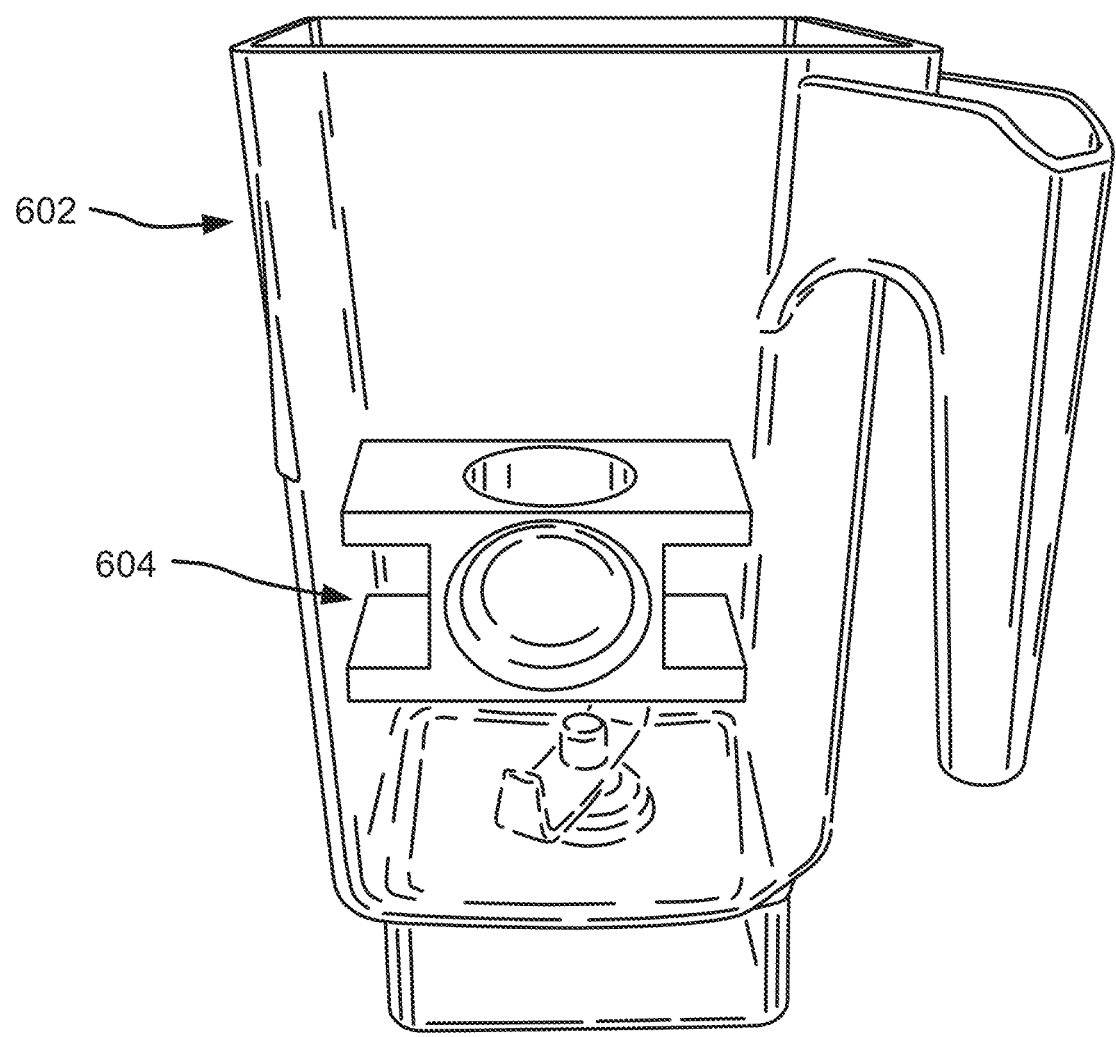
FIG. 6 is a photographic image depicting a blender container having a customized interface configured to engage a robotic arm and facilitate automation of food and beverage preparation, according to one embodiment
Figure 7A:
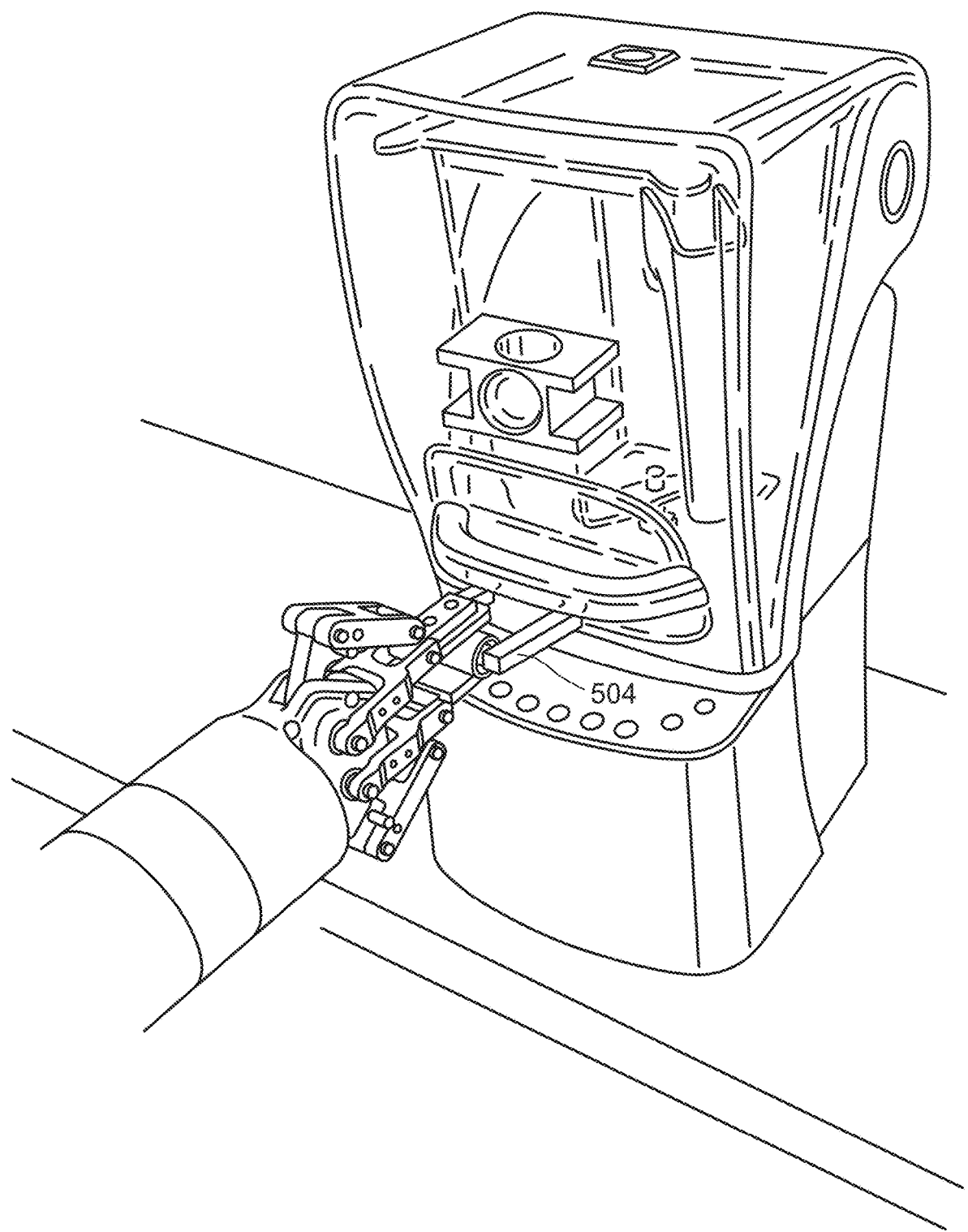
FIGS. 7A-7C are photographic images depicting three stages of a process by which a robotic arm engages a blender assembly and blender container via custom interfaces in order to automate food and beverage preparation, according to one embodiment.
Figure 7B:
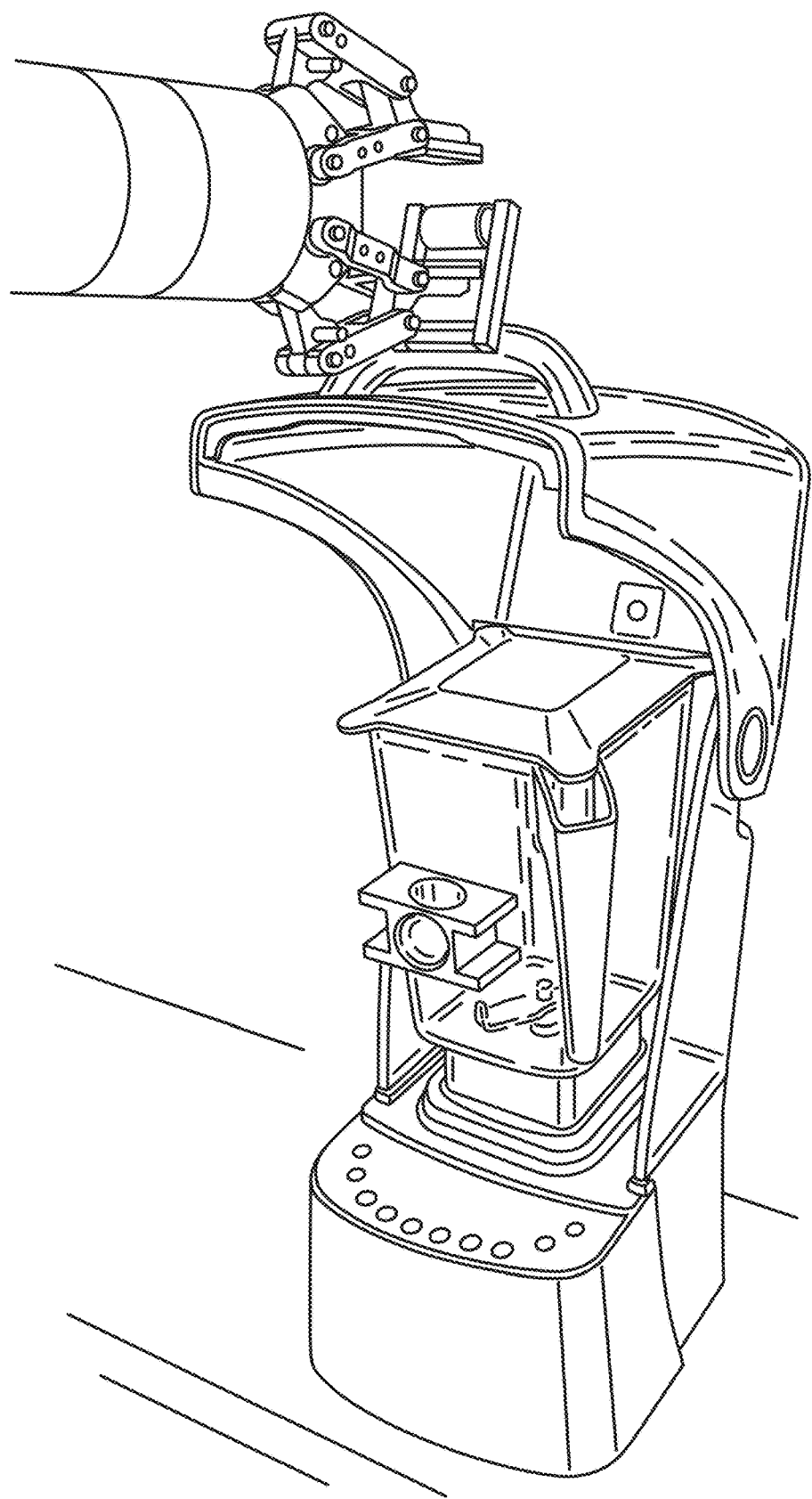
Figure 7C:
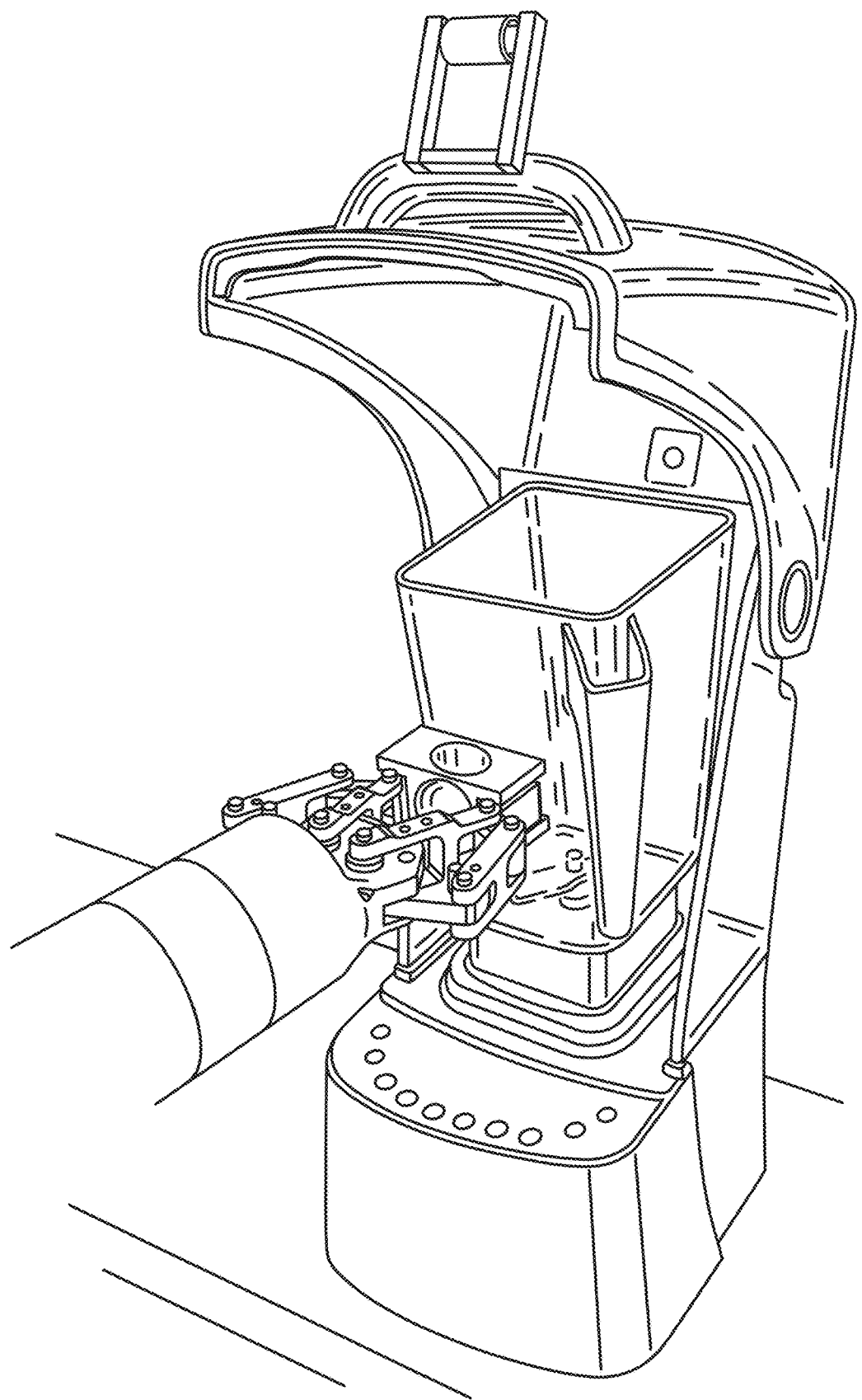

According to one implementation, and from the exemplary perspective of a blender assembly, custom interfaces to facilitate engagement of culinary tools, etc. with a robotic arm assembly may include handles, grips, etc. such as shown in FIGS. 5-6, and may be utilized in a process such as shown in FIGS. 7A-7C.

The implementation depicted in FIGS. 5-7C, and other similar assemblies, may generally include a custom fabricated (e.g. 3D-printed) handle, grip, etc. coupled to the corresponding culinary tool, etc.

As shown in FIG. 5, a blender assembly may include a splash guard 502 and a blender jar/container 602. To facilitate the robotic arm assembly opening/closing the splash guard 502, a custom-fabricated handle 504 may be coupled to the splash guard 502. As shown in FIGS. 7A-7B, the handle 504 provides a gripping point for the robotic arm assembly.

As shown in FIG. 5, a blender assembly may include a splash guard 502 and a blender jar/container 602. To facilitate the robotic arm assembly opening/closing the splash guard 502, a custom-fabricated handle 504 may be coupled to the splash guard 502. As shown in FIGS. 7A-7B, the handle 504 provides a gripping point for the robotic arm assembly.

Similarly, and as shown in FIG. 6, the blender jar 602 may feature a custom-fabricated handle 604 coupled thereto and configured to provide a gripping point for the robotic arm assembly, e.g. as shown in FIG. 7C. Preferably, the custom-fabricated handle 604 may be configured to facilitate the robot maintaining grip on the blender jar 602 during rotation of the blender jar 602, e.g. to dispense blended food and/or beverage product.

Figure 9:
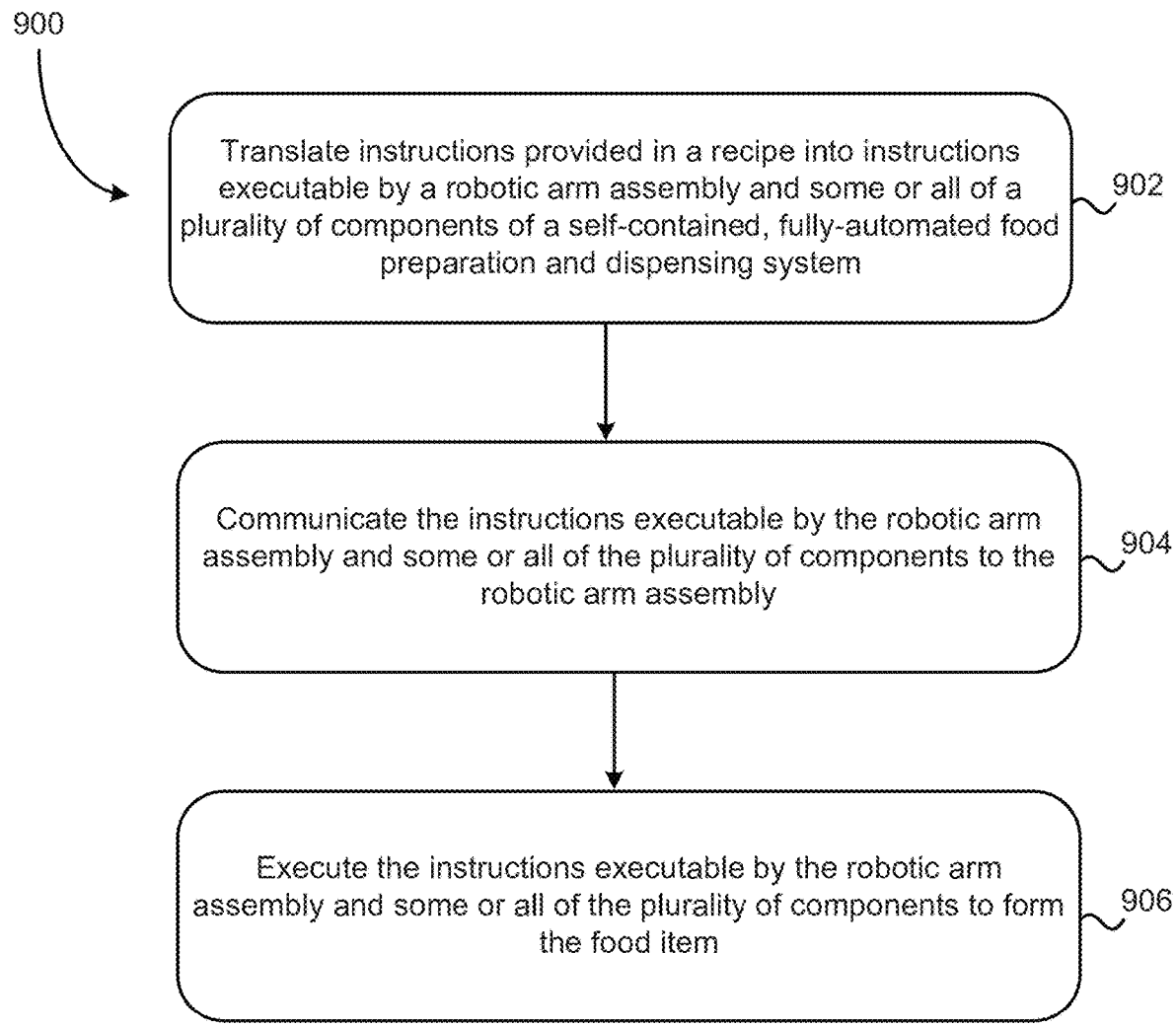
FIG. 9 is a flowchart of a method, according to one embodiment.

Turning now to FIG. 9, a method 900 for preparing and delivering a food item using a self-contained, fully-automated food preparation and dispensing system is shown, according to one embodiment. As will be appreciated by skilled artisans reading the present descriptions, the self-contained, fully-automated food preparation and dispensing system may be a kiosk, e.g. as represented in FIGS. 3-4B, and may utilize any of the equipment, components, software, networking environments, etc. described herein. As such, the method 900 may be implemented in the context of any of the hardware environments described herein and shown in FIGS. 1-8, among others, without departing from the scope of the present disclosure.

Preferably, the method 900 is performed using a self-contained, fully-automated food preparation and dispensing system, comprising: a robotic arm assembly; and a plurality of components arranged around the robotic arm assembly, each of the plurality of components being positioned within reach of the robotic arm assembly and capable of performing one or more processes. The system also preferably includes a plurality of recipes, each recipe comprising instructions regarding: one or more ingredients to be included in the food item; a respective quantity of each of the ingredients; and one or more steps for combining and preparing the ingredients to form the food item. Further still, the system preferably includes a control system configured to manage the plurality of components, e.g. a controller as shown in FIG. 4B.

As shown in FIG. 9, the method 900 includes operation 902, in which instructions provided in the recipe are translated into instructions executable by the robotic arm assembly and some or all of the components. The translation process is described in further detail below, but generally includes translating measurements and steps of the recipe into measurements and steps capable of being performed by the robotic arm assembly, optionally using other components within the system such as blenders, stoves, dispensers, etc. as described above. Preferably, the translation process determines an optimal path for the robotic arm assembly to traverse in the preparation and delivery process, such that efficiency of preparation and delivery is optimized, and collisions are minimized.

With continuing reference to FIG. 9, method 900 also includes operation 904, in which the translated instructions, i.e. the instructions executable by the robotic arm assembly and some or all of the plurality of components to the robotic arm assembly, are communicated to the robotic arm assembly. In various approaches, the instructions may be translated using a kiosk server such as shown in FIG. 1B, a recipe management module or kiosk management module of a cloud or other networked component such as also shown in FIG. 1B, or any other suitable device that would be appreciated by a skilled artisan upon reading the present disclosures. Such translation process may be performed using one or more processors of the device, and subsequently communicated to the robotic arm assembly using a network connection.

In operation 906, method 900 includes executing the instructions executable by the robotic arm assembly and some or all of the plurality of components to form the food item. Generally, executing the instructions includes using the robotic arm to gather ingredients, deliver ingredients to appropriate component(s) for processing (e.g. blending, mixing, cooking, etc.), and assembling the processed ingredients into a delivery container (e.g. cup, box, etc.).

While method 900 has been described as including operations 902-906, it should be appreciated that the method 900 may include any number of additional steps, features, etc. as described herein without departing from the scope of the presently disclosed inventive concepts. For instance, in various approaches the method 900 may include any of the following additional or alternative features, operations, etc.

In one approach, translating the instructions provided in the recipe into instructions executable by the robotic arm assembly and/or components of the kiosk may include converting units of measure expressed in the recipe into units of measure capable of being precisely delivered using the robotic arm assembly; selecting from among the plurality of components an optimal set of components to carry out the instructions provided in the recipe; selecting from among a plurality of processes configured to be performed by one or more of the optimal set of components, an optimal set of processes to employ in carrying out the instructions provided in the recipe; and distributing the optimal set of processes across the optimal set of components, wherein the robotic arm assembly and the control system act as integrators of the optimal set of processes and the optimal set of components.

Converting the units of measure may be performed, for example, substantially as described above regarding converting volume measurements stated in a recipe to weight measurements capable of being accurately and precisely measured and delivered using the robotic arm assembly and optional components such as dispensers (e.g. scoops, spoons, cups, vane systems, etc.).

Selecting the optimal set of components and/or processes may involve identifying components that contain the ingredients called for in the recipe (e.g. storage components as described above with reference to FIGS. 3-4B) and components which support the processes called for in the recipe, or suitable alternatives thereto (e.g. microwaving instead of steaming or boiling, blending instead of pureeing or macerating, etc. as would be understood by a person having ordinary skill in the art upon reading the present descriptions). The identification process may be based on a known inventory of the ingredients and/or components available to the system, and/or based on using one or more cameras mounted within the kiosk and/or on the robotic arm assembly to identify ingredients and/or components.

Identifying processes may include referencing additional information sources, such as specification(s), manual(s), information sheet(s), etc. for each component and/or respective hardware thereof in order to determine whether individual components are capable of performing the processes called for in the recipe. Similarly, identifying processes may include querying a database, table, or other reference to determine suitable alternative processes to utilize in place of processes called for in the recipe. It should be noted that in some instances, processes or individual steps thereof may utilize multiple components.

In one approach, selecting optimal sets of components and/or processes involves computing a finite set of combinations of components and processes that can be used to make the food item per the instructions provided in the recipe. For example, the computation may include determining whether to use a combination of components A, B & C or components A, B & D, where both of components C & D can perform the same operations.

Selecting optimal sets of components and/or processes may also involve computing an amount of time required to complete the food item preparation using each possible combination of components and/or processes, and selecting the combination of components and processes that requires the least amount of preparation time. In this manner, the system optimizes the efficiency of food item preparation and delivery.

In the event that multiple potential paths (i.e. combinations of components and processes) require the same amount of time, or substantially similar time (e.g. within about 15 seconds or less), the first path may be employed, so as to unevenly distribute wear to a first component among the possible components to be utilized, minimizing the probability of multiple components simultaneously breaking down.

In one approach, determining the optimal set of components and/or processes may include identifying each of the plurality of components and respective capabilities thereof. Alternatively, component identification and capability identification may be performed as part of an "initialization" process wherein the system becomes familiar with the available hardware and associated performance capabilities, e.g. in order to build a database, table, or other reference for use in determining optimal components and/or processes to employ in preparing various food items. Accordingly, translating the instructions provided in the recipe into instructions executable by the robotic arm assembly and some or all of the plurality of components may be based at least in part on the capabilities of each of the plurality of components.

In preferred approaches, the system is configured for multiplex recipe preparation, and may determine optimal combinations of processes across multiple recipes to further maximize the efficiency of food preparation. Accordingly, method 900 may include managing multiplex preparation and delivery of multiple completed food items corresponding to at least partially similar recipes using an operating system of the self-contained, fully-automated food preparation and dispensing system.

Beyond determining the optimal set of processes and components, food preparation and delivery techniques such as method 900 may include receiving user input and adjusting elements of the recipe creation process to accommodate individual users' preferences, dietary needs or restrictions, nutritional goals, etc. Most commonly, this involves adjusting the amount or type of ingredients utilized in preparing a food item, but may also involve adjusting the processes and/or components utilized in preparing food items (e.g. if an item is to be made "Kosher" then it may require use of components that have not come into contact with non-Kosher ingredients).

Accordingly, method 900 may include receiving user input and adjusting either or both of: an amount of one or more of the ingredients delivered by the robotic arm assembly to the some or all of the optimal set of components; and the optimal set of processes based on the user input.

Software Environment

In preferred approaches, a software system (e.g. foodOS™) may be employed to facilitate control of the system as a whole. For instance, an exemplary software system may include one or more of the following subsystems, functions, etc.

In one embodiment, a command and control software system supports higher level applications for discovering, ordering, managing and retrieving orders/beverages, refining, publishing and sharing recipes, manages all core functions required by the foodOS™ such as Dispensing, Mixing, Stirring, Blending, Mixing, Layering, Heating, Cooling, Wrapping, Pouring, Serving, Cleaning etc., and preferably provides a consistent software/driver interface to the command and control hardware System and various hardware subsystems such as Dispensers, Blenders etc. More preferably, the command and control software system provides load balancing, scheduling, monitoring, error detection and correction and robustness to allow for a distributed robotic kitchen deployment.

According to a preferred embodiment, foodOS™ is a distributed operating system for software-driven food prep that allows for applications (such as recipe creation, publication, discovery, recommendation and consumption) to happen across a network of kiosks, each kiosk using a number of Internet of Things (IoT)-enabled devices/subsystems, interfacing with consumers using a variety of devices and interaction paradigms. FoodOS™ supports various food operations (such as mixing, stirring, blending, heating, pouring etc.) and provides control and management functions such as scheduling, multitasking, monitoring, error detection & correction, fault tolerance and resilience etc. to each kiosk in the network Pattern Recognition and Recommendations In more embodiments, the software system may include a user interface that allows discovery of available kiosks in a given proximity, available food and beverage options in them, needed time to prepare, personalization for a given food or beverage item (less salt, skip celery, etc.), ordering & payment, status check, authentication for dispensing etc.

In preferred approaches, this aspect of personalization, discovery, etc. may include a system to capture consumer purchase and/or consumption data, consumer allergic profile and lifestyle or nutritional goals, and ability to define and extract proprietary features along n-dimensions and perform recommendations.

The availability of information across a user's choice, ingredients, nutrients, taste and several other aspects such as acidic content of food, temperature of food, choice under different climatic conditions . . . provide for a rich set of data for machine learning and personalization.

In operation, such a system may utilize machine learning techniques, e.g. to create hierarchical clusters of users into specific sets based on the recipes they have purchased or consumed. For example, a set of users might have consumed a Peach Mango smoothie, a subset of them might have opted for a specific recipe for Peach Perfection that uses more peaches and less mangoes and yet another subset of them might have opted for less juice in the recipe. The intelligent clustering allows investigation of consumer behavior, and allows prediction of other recipes the consumers may enjoy, as well as modifications to particular recipes previously ordered by the consumer, which may better fit the consumer's dietary goals, for instance.

In another aspect, the machine learning techniques may be utilized to create hierarchical clusters of users into specific sets based on the ingredients they might have affinity towards based on their purchase or consumption behavior. For example, a set of users might have affinity towards peaches while a subset of them might have affinity towards organic peaches. Recipe adjustments for individual consumers based on ingredient affinities may be implemented using such data, and may facilitate users meeting dietary goals such as number of calories, protein intake, veggie intake, vitamin intake etc. as would be understood by a person having ordinary skill in the art upon reading the present descriptions.

In yet another aspect, the machine learning techniques may be utilized to create hierarchical clusters of users by allergies. For example, a set of users might be allergic to peanuts, a different set of users might be allergic to tree nuts, while yet a different set of users might be allergic to eggs vs. the milk vs. the shellfish vs. fish vs. wheat and their derivatives vs. soy and their derivatives. Recipe adjustments for individual consumers based on allergies or other dietary restrictions may be implemented using such data.

In further embodiments, the machine learning techniques may be utilized to segment the hierarchical clusters above by geographic region, seasonality and time of day.

In accordance with any of the foregoing techniques, a number of algorithms can be used to create hierarchical clusters including but not limited to K-means clustering, simple and agglomerative hierarchical clustering, self-organizing maps, etc. as would be understood by a person having ordinary skill in the art upon reading the present descriptions.

Accordingly, in one embodiment the machine learning techniques may be utilized for collaborative filtering and nearest neighbor approaches to create affinity among various clusters. A number of algorithms can be used to create adjacencies including but not limited to K-NN algorithms, Latent Semantic Hashing etc.

As hinted above, in preferred approaches the machine learning techniques may be utilized to implement a recommendation system that utilizes the hierarchical clustering and adjacencies defined above to make recommendations about specific food items and recipes to consumers. This includes memory-based recommendations such as user-item based recommendation, user-user based recommendation and item-item based recommendations, in various embodiments. Creating a recommendation system as suggested herein may include utilizing latent factor based recommendation systems such as alternating least squares (ALS), deep learning based systems, neural networks and random forest models.

Advantageously, using such machine learning algorithms, collaborative filtering and nearest neighbor approaches enables determining affinity among various clusters such that demand for various ingredients and consumables can be forecast accurately minimizing overstocking and waste.

To provide the most appropriate recommendations, the presently disclosed inventive concepts rely on the use of high quality data that is accurate across multiple dimensions, which may be obtained from orders submitted to kiosks. Some of the dimensions useful in the context of such clustering include: quantity of ingredients, type of ingredients (regular, organic, non-GMO-when available as a standalone or jointly), viscosity, geographic locations, allergies, etc. as would be appreciated by a person having ordinary skill in the art upon reading the present descriptions.

Vision System

Alternatively and/or additionally, the software system is further configured to detect various ingredients through image processing and sensors. Preferably, the software comprises and/or is configured to provide information and/or instructions to an auto programmable system that uses a machine vision system to identify various elements within the system, and self programs itself to prepare and dispense food and/or beverage products.

There are many machine vision systems that are available in the market and typically the detection techniques use QR codes, face recognition and several object recognition techniques. For a three dimensional space, the conventional detection methods use multiple stereoscopic cameras to model and detect various objects in the system. However, objects could move due to natural movement which causes undesirable and unnecessary recalibration of the system, to the point where normal operation is not feasible.

Moreover, the problem in object identification for robotics systems as described herein are two-fold. First is the detection of objects in a macro sense (e.g. within the kiosk), and the second is to identify exact location relative to the robotic arm assembly's point of view. The presently disclosed inventive concepts propose to solve these challenges via a two-camera solution that is used to precisely detect and identify all objects within the system.

A first camera is a wide angle camera that is placed in the kiosk such that it has complete view of the kiosk. Using this view, all objects can be viewed and there a gross level identification may be performed using known image processing techniques such as techniques employing QR codes, object color, and/or Outline Object Recognition (OOR). A second camera is preferably mounted on the robotic arm assembly and can be precisely positioned to view any place in the kiosk.

Those having ordinary skill in the art will appreciate that the exemplary camera setup described above may be modified, and in various embodiments the camera system may generally include (n+1) cameras (or other suitable optical sensors that would be appreciated by a skilled artisan upon reading the present descriptions), with n cameras being deployed around the kiosk in an arrangement configured to provide a complete view of the interior of the kiosk (and optionally portions of the exterior, e.g. an area outside the kiosk in the vicinity of the customer communication and order pickup component 304d), while the one additional camera is mounted on the robotic arm assembly as described above. In more approaches, one or more light sensor(s) configured to detect lighting conditions (e.g. intensity and distribution of lighting within the kiosk) may be employed to facilitate the operation of the optical sensors, and/or determine lighting conditions per se.

In operation, the first camera captures an image and baselines the approximate positions of all objects within system using known image processing techniques. As a second step the arm goes to the approximate location as identified by the first camera as corresponding to a particular object, and tries to identify the object from that position. Once it identifies the object, it computes the exact location of the object by taking 3 different pictures from 3 different positions of the robot and mathematically computes the actual co-ordinate location of the object.

Once the baseline is established as noted above, for subsequent object detection the same process may be repeated and the deviations from the baseline computed to detect object motion within the kiosk. This approach advantageously allows the system to detect displacement of objects and account for such movement in the course of food preparation and/or servicing the kiosk (e.g. replacement of exhausted ingredients, cleaning, mechanical service, etc.).

Further still, the software may be configured to check the temperature, moisture and other properties of food and/or the system environment in a reliable manner based at least in part on using sensors adjusting for altitude, room temperature and other variations that make food making difficult In one approach, the software system is configured to detect and correct anomalies automatically. The corrections may include one or more of: software errors—for example auto substitution of ingredients such as sweetener in place of sugar (e.g. a recipe may say add 1 spoon of sugar but software makes the correction based on customer's preference, which may be defined in the customer profile); electrical errors—such as compensating appropriately for sensor errors (for example if temperature detection malfunctions it is compensated appropriately based on a time-based function); and/or mechanical errors—for example if a cup falls down, detecting and placing it in the right spot, detecting a hardware failure such as a blender, and instructing use of a redundant component to perform food preparation and/or dispensation.

The software system may also include a dispensing system management system that automatically compensates for hardware inaccuracies. For example, if a dish requires 1 cup of mango and 1 spoon of sugar and the hardware dispensing system dispenses 1.1 cup of mango due to error, software compensates dynamically by adjusting the sugar request to 1.1 spoon of sugar, thus maintaining recipe consistencies.

Further still with reference to exemplary software, from the software system's perspective hardware may be organized by component type (such as slicer, blender, dispenser, etc.) and all components are preferably integrated with a central robot or robot(s). In one exemplary approach, this integration and organization facilitates failover correction, e.g. when one of the components fail such as slicer, the robotic arm assembly may compensate by slicing manually. This sort of override is automatically provided thus increasing the reliability of the system, in preferred approaches.

Advantageously, the software system preferably allows integration of hardware components and allows customers to create new software with or without programming skills. Advantages of this approach may include, for example, optimizing scheduling and performance of tasks for time and efficiency; staging the system to adjust/accommodate for varying demands (for example, between 12-1 if the demand is going to peak during lunch hours, anticipate and prep such that the demand can be met without adding additional capacity during peak hours); recording video with each dish that validates the entire process to customer satisfaction, etc. as would be understood by a person having ordinary skill in the art upon reading the present disclosures.

The software system may additionally and/or alternatively employ a customer facing mobile and/or web-based software interface to discover, order, manage and retrieve orders/beverages, refine, publish and share recipes and manage deployments of robotic kitchens. Advantages of this feature include the ability to: place orders from anywhere and pick it up anywhere; automatically route order across to right systems based on availability of ingredients, proximity to location and demand on the system; allow consumers to create new recipes by defining ingredients, utensils, modules and processes; allow consumers to customize a previously published recipe and personalize it to their taste; allowing users to control the value of each ingredient and fine-tune the sequence of processes to define custom recipes; allow consumers to publish their version of recipe.

Other advantageous features within the scope of the present disclosures may include remote monitoring, control, operation and reprogramming of robotic kitchens and vending machines to dispense different menus (based on seasonality, trends and other factors, etc.). Cameras and alerts may be employed to detect and report potential breach or dangers. Order management for ingredients may be provided to adjust for anticipated need; substitution of ingredients based on dietary preferences and availability; an integrated dietary management system that plans dishes, gets ingredient ready and makes them at the right times; and/or an automatic food management system that optimizes food wastage based on need, shelf life and automatic substitutions.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method comprising:
   storing a plurality of food recipes in a cloud computing system, the food recipes specifying a plurality of ingredients and corresponding amounts;
   receiving, in the cloud computing system, an order specifying a first food item having a first food recipe of the plurality of food recipes;

translating, by the cloud computing system, the first food recipe into a plurality of instructions and corresponding weights or volumes; and receiving at least a first portion of the instructions in a plurality of software controlled hardware ingredient dispensers of a first automated food production system at a first location, wherein the plurality of instructions control the plurality of software controlled hardware ingredient dispensers to dispense ingredients according to the corresponding weights or volumes, receiving at least a second portion of the instructions in a robotic system of the first automated food production system to move one or more containers between the software controlled hardware ingredient dispensers to assemble the first food item according to the first food recipe, wherein the plurality of food recipes further specify an error tolerance for the plurality of ingredients.

2. The method as recited in claim 1, wherein the order is received from a mobile application.

3. The method as recited in claim 1, further comprising:
receiving, in the cloud computing system, a second order specifying a second food item having a second food recipe of the plurality of food recipes;
translating, by the cloud computing system, the second food recipe into a second plurality of instructions and corresponding weights or volumes; and
receiving at least a first portion of the second plurality of instructions in a second plurality of software controlled hardware ingredient dispensers of a second automated food production system at a second location, wherein the second plurality of instructions control the second plurality of software controlled hardware ingredient dispensers to dispense ingredients according to the corresponding weights or volumes,
receiving at least a second portion of the second plurality of instructions in a second robotic system of the second automated food production system to move one or more second containers between the second plurality of software controlled hardware ingredient dispensers to assemble the second food item according to the second food recipe.

4. The method as recited in claim 1, wherein the first food item and the second food item are the same type of food items.

5. The method as recited in claim 1, wherein the first food item and the second food item are different types of food items.

6. The method as recited in claim 1, wherein the first food item is a solid food item and the second food item is a liquid food item.

7. The method as recited in claim 1, further comprising adjusting the recipe based on input from a user.

8. The method as recited in claim 7, wherein adjusting the recipe comprises adjusting an amount of ingredients.

9. The method as recited in claim 7, wherein adjusting the recipe comprises adjusting an type of ingredients.

10. The method as recited in claim 1, further comprising measuring a weight of the ingredients as the ingredients are dispensed.

11. The method as recited in claim 10, wherein the first portion of instructions cause the plurality of software controlled hardware ingredient dispensers to dispense ingredients according to the corresponding weights or volumes sequentially, and wherein when one or more previously dispensed ingredients is outside a corresponding error tolerance, subsequent ingredients are adjusted within corresponding error tolerances.

12. The method as recited in claim 11, wherein said subsequent ingredients are adjusted comprises computing a difference between an expected dispensed weight and an actual dispensed weight.

13. The method as recited in claim 1, further comprising, in response to receiving the order:
generating a query for user information; and
modifying the first food recipe based on the user information.

14. The method as recited in claim 1, wherein the plurality of food recipes comprise natural language descriptions.

15. The method as recited in claim 1, wherein the amounts are specified in volumes, and wherein the weights are specified in grams.

16. The method as recited in claim 1, wherein said translating comprises an average value of a particular ingredient.

17. The method as recited in claim 1, wherein the cloud computing system comprises a first server and the first automated food production system comprises a second server.

18. The method as recited in claim 1, wherein the robotic system is a robotic arm, and wherein the software controlled hardware ingredient dispensers are within reach of the robotic arm.

19. The method as recited in claim 1, wherein the first automated food production system is a self-contained kiosk.

20. An automated food preparation system, comprising:
a cloud computing system;
a plurality of software controlled hardware ingredient dispensers coupled to the cloud computing system for performing food preparation tasks; and
a robotic system coupled to the cloud computing system, wherein the cloud computing system:
store a plurality of food recipes, the food recipes specifying a plurality of ingredients and corresponding amounts;
receives an order specifying a first food item having a first food recipe of the plurality of food recipes;
translates the first food recipe into a plurality of instructions and corresponding weights or volumes; and
sends at least a first portion of the instructions to a plurality of software controlled hardware ingredient dispensers of a first automated food production system at a first location, wherein the plurality of instructions control the plurality of software controlled hardware ingredient dispensers to dispense ingredients according to the corresponding weights or volumes; and
sends at least a second portion of the instructions a robotic system of the first automated food production system to move one or more containers between the software controlled hardware ingredient dispensers to assemble the first food item according to the first food recipe,
wherein the plurality of food recipes further specify an error tolerance for the plurality of ingredients.

21. A non-transitory computer-readable medium storing computer-executable instructions for performing a method of preparing a food item, the method comprising:
storing a plurality of food recipes in a cloud computing system, the food recipes specifying a plurality of ingredients and corresponding amounts;

receiving, in the cloud computing system, an order specifying a first food item having a first food recipe of the plurality of food recipes;

translating, by the cloud computing system, the first food recipe into a plurality of instructions and corresponding weights or volumes; and receiving at least a first portion of the instructions in a plurality of software controlled hardware ingredient dispensers of a first automated food production system at a first location, wherein the plurality of instructions control the plurality of software controlled hardware ingredient dispensers to dispense ingredients according to the corresponding weights or volumes, receiving at least a second portion of the instructions in a robotic system of the first automated food production system to move one or more containers between the software controlled hardware ingredient dispensers to assemble the first food item according to the first food recipe, wherein the plurality of food recipes further specify an error tolerance for the plurality of ingredients.

\* \* \* \* \*